United States Patent
Jagadeesan et al.

(10) Patent No.: US 12,321,880 B2
(45) Date of Patent: Jun. 3, 2025

(54) CENTRALIZED SKILLS MANAGEMENT VIA STANDARDIZED SKILL TAGGING ACROSS TENANT RESOURCES

(71) Applicant: Microsoft Technology Licensing, LLC, Redmond, WA (US)

(72) Inventors: Srivathsan Jagadeesan, Sammamish, WA (US); Swati Jhawar, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 381 days.

(21) Appl. No.: 17/696,284

(22) Filed: Mar. 16, 2022

(65) Prior Publication Data

US 2023/0297927 A1    Sep. 21, 2023

(51) Int. Cl.
*G06Q 10/0639* (2023.01)
*G06F 16/31* (2019.01)

(52) U.S. Cl.
CPC ....... *G06Q 10/06398* (2013.01); *G06F 16/31* (2019.01)

(58) Field of Classification Search
CPC ............. G06Q 10/063; G06Q 10/0639; G06Q 10/06398; G06F 16/31
See application file for complete search history.

(56) References Cited

U.S. PATENT DOCUMENTS

| | | |
|---|---|---|
| 10,354,017 B2 | 7/2019 | Skomoroch et al. |
| 10,380,552 B2 | 8/2019 | Zhang et al. |
| 10,380,701 B2 | 8/2019 | Lin et al. |
| 10,462,255 B2 | 10/2019 | Schissel et al. |
| 10,902,061 B2 | 1/2021 | Chen et al. |
| 11,164,153 B1 | 11/2021 | Hinton et al. |
| 2009/0177597 A1 | 7/2009 | Dube et al. |

(Continued)

FOREIGN PATENT DOCUMENTS

| | | |
|---|---|---|
| CN | 109918483 B | 7/2021 |
| CN | 113439279 A | 9/2021 |
| WO | 2020003325 A1 | 1/2020 |

OTHER PUBLICATIONS

"2021 Workplace Learning Report", Retrieved from: https://learning.linkedin.com/resources/workplace-learning-report, Retrieved on: Mar. 2, 2021, 5 Pages.

(Continued)

*Primary Examiner* — William S Brockington, III
(74) *Attorney, Agent, or Firm* — Foley IP Law, PLLC

(57) ABSTRACT

A centralized skills management server, a computer-readable storage medium, and a computer-implemented method for standardized skill tagging are described herein. The method includes accessing, via a processor of the computing system, a property graph including data objects corresponding to a tenant and extracting skills-related terms from object metadata corresponding to the data objects within the property graph. The method also includes interfacing with a global skills graph via an API and importing standardized skill tags from the global skills graph, where the imported standardized skill tags relate to the extracted skills-related terms from the object metadata. The method further includes incorporating the standardized skill tags into the object metadata for the corresponding data objects within the property graph.

26 Claims, 13 Drawing Sheets

(56) References Cited

U.S. PATENT DOCUMENTS

| | | | |
|---|---|---|---|
| 2014/0278633 A1 | 9/2014 | Daly et al. | |
| 2014/0310037 A1* | 10/2014 | Griffin | G06Q 10/0631 |
| | | | 705/7.12 |
| 2015/0127567 A1 | 5/2015 | Menon et al. | |
| 2015/0242795 A1 | 8/2015 | Hilton | |
| 2015/0317376 A1 | 11/2015 | Bauer | |
| 2016/0092998 A1 | 3/2016 | Goel | |
| 2016/0098663 A1* | 4/2016 | Skiba | H04M 3/523 |
| | | | 705/7.39 |
| 2017/0068922 A1 | 3/2017 | Singh et al. | |
| 2017/0220971 A1 | 8/2017 | Giammaria | |
| 2019/0066030 A1* | 2/2019 | Hancock | G06N 5/04 |
| 2019/0340945 A1 | 11/2019 | Malhotra et al. | |
| 2020/0090053 A1* | 3/2020 | Silverman | G06F 40/211 |
| 2020/0126022 A1 | 4/2020 | Gaspar | |
| 2020/0242714 A1 | 7/2020 | Doti et al. | |
| 2021/0044699 A1* | 2/2021 | Thalange | G06Q 10/06398 |
| 2021/0295822 A1* | 9/2021 | Tomkins | G10L 15/16 |
| 2021/0357378 A1* | 11/2021 | Urdiales | G06N 3/08 |
| 2022/0020282 A1 | 1/2022 | Elewitz | |
| 2022/0058482 A1 | 2/2022 | Yu | |
| 2022/0147945 A1 | 5/2022 | Yoshikawa | |
| 2022/0188659 A1* | 6/2022 | Krasnoslobodtsev | |
| | | | G16H 70/40 |
| 2023/0132465 A1 | 5/2023 | Kumar et al. | |
| 2023/0297908 A1 | 9/2023 | Jagadeesan et al. | |
| 2023/0297927 A1 | 9/2023 | Jagadeesan | |

OTHER PUBLICATIONS

"Aligning Your Entire Organization Around the Customer", Retrieved from: https://web.archive.org/web/20211116172619/https:/www.quantummetric.com/harvard-business-review-analytic-services-report/, Nov. 16, 2021, 2 Pages.

"Build talent with skills you need", Retrieved From: https://www.cornerstoneondemand.com/uk/solutions/skills-graph/, Retrieved on: Jan. 29, 2022, 10 Pages.

Aderhold, et al., "Cobrainer Technology Whitepaper", In Technology Whitepaper of Cobrainer, Jan. 2020, 8 Pages.

Bersin, Josh, "In a Bold and Aggressive Move, Linkedin Unleashes Its LXP and More", Retrieved from: https://joshbersin.com/2021/04/in-a-bold-and-aggressive-move-linkedin-unleashes-its-lxp-and-more/, Apr. 20, 2021, 5 Pages.

Garland, Stacie, "Everything You Need to Know About Skill Testing", Retrieved from: https://vervoe.com/skill-testing/, Jun. 22, 2020, 20 Pages.

Guo, Qi, "The AI Behind LinkedIn Recruiter Search and Recommendation Systems", Retrieved from: https://engineering.linkedin.com/blog/2019/04/ai-behind-linkedin-recruiter-search-and-recommendation-systems, Apr. 22, 2019, 10 Pages.

Ignatius, Adi, "The Real Deal on Data", Retrieved From: https://web.archive.org/web/20200112224054/https:/hbr.org/2020/01/the-real-deal-on-data, Jan. 12, 2020, 2 Pages.

Jia, et al., "Representation of Job-Skill in Artificial Intelligence with Knowledge Graph Analysis", In Proceedings of IEEE Symposium on Product Compliance Engineering—Asia (ISPCE-CN), Dec. 5, 2018, 6 Pages.

Kivimaki, et al., "A Graph-Based Approach to Skill Extraction from Text", In Proceedings of TextGraphs-8 Graph-Based Methods for Natural Language Processing, Oct. 18, 2013, pp. 79-87.

Laprade, et al., "The Enterprise Guide to Closing the Skills Gap", Published by IBM Institute for Business Value, Nov. 22, 2019, 20 Pages.

Mat, Cyril L., "What Is the Cornerstone Skills Graph?", Retrieved from: https://www.cornerstoneondemand.com/resources/article/what-cornerstone-skills-graph/, Oct. 5, 2020, 7 Pages.

Roslansky, Ryan, "You Need a Skills-Based Approach to Hiring and Developing Talent", Retrieved from: https://hbr.org/2021/06/you-need-a-skills-based-approach-to-hiring-and-developing-talent, Jun. 8, 2021, 6 Pages.

Schwartz, et al., "Rewriting the Rules for the Digital Age", Published by Deloitte University Press, Jul. 4, 2017, 144 Pages.

Ung, Elisa, "The Human-Centered CEO", Retrieved from: https://www.forbes.com/sites/insights-ey/2021/07/01/the-human-centered-ceo/?sh=7675bb9f65a5, Jul. 1, 2021, 4 Pages.

Gugnani, et al., "Generating Unified Candidate Skill Graph for Career Path Recommendation", In Proceedings of International Conference on Data Mining Workshops, Nov. 17, 2018, pp. 328-333.

"International Search Report and Written Opinion Issued in PCT Application No. PCT/US22/053295", Mailed Date: Apr. 25, 2023, 12 Pages.

"International Search Report and Written Opinion Issued in PCT Application No. PCT/US22/053903", Mailed Date: May 10, 2023, 10 Pages.

Final Office Action mailed on Jun. 5, 2024, in U.S. Appl. No. 17/696,313, 21 pages.

Non-Final Office Action mailed on Feb. 29, 2024, in U.S. Appl. No. 17/696,313, 16 pages.

"Cornerstone skills graph helps organisations and their people instantly map skills and effectively respond to rapid change", M2 Presswire, Retrieved from https://dialog.proquest.com/professional/docview/2443757697?accountid=131444, Sep. 17, 2020, 06 Pages.

Notice of Allowance mailed on Oct. 30, 2024, in U.S. Appl. No. 17/696,313, 10 pages.

* cited by examiner

506

"title": Microsoft 365 Security Administration (MS-500) Cert Prep: 2 Implement and Manage Threat Protection
"shortDescription": The Office 365 (O365) Administrator will support the continual operations and improvements of our O365 tenant, including ensuring the effective use of O365 for our customers, and helping the organization follow best practices for M365 and Azure. The administrator will act as the subject matter expert and technical role with comprehensive knowledge of O365, Enterprise Mobility + Security (EMS), Defender ATP, and Intune. The administrator performs day-to-day activities in our O365 environment including operations of a hybrid environment, co-management, directory-sync. This role will partner with other team members to monitor and review data loss and prevention (DLP) alerts and activities and recommend improvements for an effective DLP strategy.
"sourceSkills": ("Cybersecurity", "O365 Security")
"skillTags" : [{'name': 'Microsoft Exchange', 'id': 'urn:li:skill:474'}, {'name': 'Microsoft 365', 'id': 'urn:li:skill:56092'}, {'name': 'Office 365 Administration', 'id': 'urn:li:skill:56125'}, {'id': 'urn:li:skill:8936', 'name': 'DLP'}, {'id': 'urn:li:skill:9164', 'name': 'Security Information and Event Management (SIEM)'}, { 'id': None, 'name': 'Enterprise Mobility'}]

FIG. 5B

CENTRALIZED SKILLS MANAGEMENT VIA STANDARDIZED SKILL TAGGING ACROSS TENANT RESOURCES

BACKGROUND

The present disclosure relates to skills management within the employer/employee context. In particular, the present disclosure relates to centralized skills management via standardized skill tagging across diverse tenant data sources.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for standardized skill tagging is described. The method is implemented in a computing system including a processor. The method includes accessing, via the processor, a property graph including data objects corresponding to a tenant and extracting skills-related terms from object metadata corresponding to the data objects within the property graph. The method also includes interfacing with a global skills graph via an application programming interface (API) and importing standardized skill tags from the global skills graph, where the imported standardized skill tags relate to the extracted skills-related terms from the object metadata. The method further includes incorporating the standardized skill tags into the object metadata for the corresponding data objects within the property graph.

In another embodiment, a centralized skills management server is described. The centralized skills management server includes a processor and a computer-readable storage medium operatively coupled to the processor. The computer-readable storage medium includes computer-executable instructions that, when executed by the processor, cause the processor to access a property graph including data objects corresponding to a tenant and to extract skills-related terms from object metadata corresponding to the data objects within the property graph. The computer-readable storage medium also includes computer-executable instructions that, when executed by the processor, cause the processor to interface with a global skills graph via an API and to import standardized skill tags from the global skills graph, where the imported standardized skill tags relate to the extracted skills-related terms from the object metadata. The computer-readable storage medium further includes computer-executable instructions that, when executed by the processor, cause the processor to incorporate the standardized skill tags into the object metadata for the corresponding data objects within the property graph.

In another embodiment, a computer-readable storage medium is described. The computer-readable storage medium includes computer-executable instructions that, when executed by a processor, cause the processor to access a property graph including data objects corresponding to a tenant and to extract skills-related terms from object metadata corresponding to the data objects within the property graph. The computer-executable instructions, when executed by the processor, also cause the processor to interface with a global skills graph via an API and to import standardized skill tags from the global skills graph, where the imported standardized skill tags relate to the extracted skills-related terms from the object metadata. The computer-executable instructions, when executed by the processor, further cause the processor to incorporate the standardized skill tags into the object metadata for the corresponding data objects within the property graph.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIGS. 5A and 5B are a process flow diagram showing an exemplary implementation in which the skill-tag standardizer is utilized to tag a position data object with standardized skill tags;

DETAILED DESCRIPTION

Figure 1A:
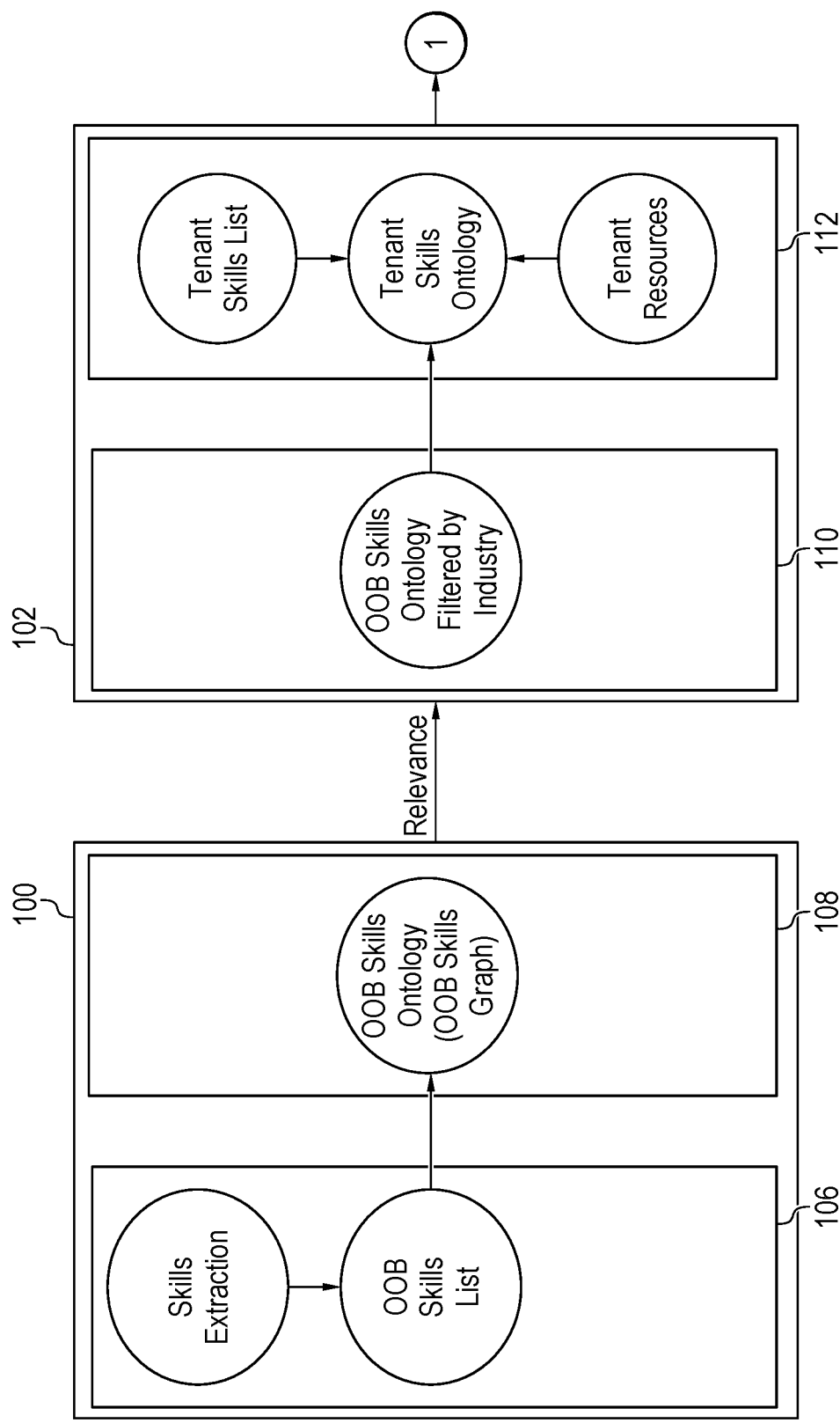
FIGS. 1A and 1B are a schematic view depicting several conventional skills management solutions.

As a preliminary matter, some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

Maintaining a skilled workforce is pivotal to an organization's success. Consider a retail company implementing an omni-channel strategy, an automobile company moving into the electric vehicle market, or a healthcare company learning to deal with a new pandemic disease. In each case, expanding the organization to cover the new area of interest requires the organization to adapt to entire systems of new skills and to train their employees with such skills. The more skilled the employees are, the more efficient they will be in innovating and producing results. To this end, organizations are increasingly focusing on training in-house talent by providing opportunities and resources that map to employees' skills and aspirations, as well as competing to hire the best talent to fill skill gaps. In today's marketplace, skills management is viewed as a key investment area for organizations, with many organizations investing in some type of skills management solution and/or purchasing skills datasets, where the term "skill" as used herein generally refers to the ability to perform a particular task and/or to fit a particular role. Some non-limiting examples of skills include communication skills, software development skills, data management skills, networking skills, leadership skills, and the like.

The demand to develop new skills holds true at the employee level as well. In general, skills become obsolete relatively quickly, with more technical skills becoming obsolete most rapidly. Therefore, adapting with skill trends is imperative to remain relevant in the high-paid skills market. Given this situation, employees are becoming increasingly concerned with steering their own ongoing skills development, and many employees expect their employers to support them in this journey.

Within the skills management domain, customer needs vary depending on whether the customer is an employee, a manager/employer, or an overall organization. More specifically, from the employee's perspective, skills management solutions are helpful for personal development, career advancement, job searching, job retention, and networking purposes, for example. From the manager's/employer's perspective, skills management solutions are helpful for team hiring, onboarding, and assignment planning/staffing purposes, for example. Moreover, from the overall organization's perspective, skills management solutions are helpful for organization transformation, talent deployment, leadership hiring/succession planning, and mergers and acquisitions purposes, for example. To summarize, skills-pivoted solutions help organizations to identify which skills are already possessed by the organization, as well as to identify skill gaps that should be filled, enabling organizations to stay relevant while preparing for the future. In addition, skills-pivoted solutions help organizations to surface skills-based resources, opportunities, and connections to employees, thus making "skilling" ubiquitous, always available, and a natural part of work.

However, despite all the potential benefits of skills management solutions, such solutions are still lacking. For example, according to current skills management techniques, organizations typically maintain user data and resources in silos across human resource (HR) solutions, skill-tagged with taxonomies that barely align. More specifically, organizations currently use multiple purpose-built solutions or providers to solve core HR problems, such as master data management, recruiting, learning, and talent development. The market is fragmented, with each tool using a unique skills taxonomy. This fragmentation between the tools and the datasets affects an organization's ability to have an all-up understanding of its skills and to provide a seamless experience to its employees. Furthermore, organizations generally prefer their internal skills library to be derived from their organizational needs and values. As a result, organizations tend to build their own skills databases, in which tenant resources distributed across systems are tagged with different skills taxonomies. However, this approach creates inefficiencies in surfacing relevant resources to employees in a seamless manner, as well as inefficiencies in generating a combined view of the skills possessed by the organization's employees.

In addition, the lack of integration among current skills management solutions restricts an employee's ability to understand, develop, and utilize their skills in a complete manner. In general, such lack of integration forces employees to jump between non-coherent user experiences in various applications and tools, often outside the flow of their everyday work, to discover opportunities, content, and connections related to skills they possess and/or wish to acquire. For an employee, this is nonproductive and frustrating, resulting in low adoption rates across most HR solutions.

Turning now to details regarding the skills management landscape, the following list of definitions provides additional context for the discussion that is to follow:

The term "skills ontology" refers to the process of defining and measuring relationships between skills. In particular, skills ontology can be used to aid in the generation of skills graphs that define relationships between skills. Stated more broadly, skills ontology may be viewed as the common language of skills with respect to a particular industry or tenant.

The term "skills taxonomy" refers to a hierarchical system of skill classification that can categorize and organize skills in groups or clusters. Generally speaking, skills taxonomy takes the form of a tree, while skills ontology takes the form of a graph.

The term "skills inference" refers to the ability of a system to automatically determine (or "infer") skills related to particular text or signals, for example.

The term "skill validation" refers to the process of validating artificial intelligence (AI)-inferred skills with the user to ensure accuracy. Advanced systems also use endorsements by colleagues, peers, and/or managers and, in some cases, tests or assessments to validate the AI-inferred skills.

As used herein, the term "tenant" refers to a particular organization or other type of entity for which skills management solutions are implemented. Generally speaking, each tenant is defined by a number of computing systems that are operated by users who are associated with the tenant. For embodiments in which the tenant is a particular organization, such users may include, for example, employees, managers, administrators, owners, and the like corresponding to the organization.

The term "tenant skills list" refers to a list of skills generated at the tenant level based on skills that are relevant to the tenant.

The term "tenant skills ontology" refers to tenant skills lists mapped onto a skills management provider's skills ontology to generate a tenant skills graph. This tenant skills ontology can then be used to power employee experiences at the tenant level. However, as described herein, the tenant skills ontologies provided by current skills management systems suffer from fragmentation issues that negatively impact such employee experiences.

Figure 1B:
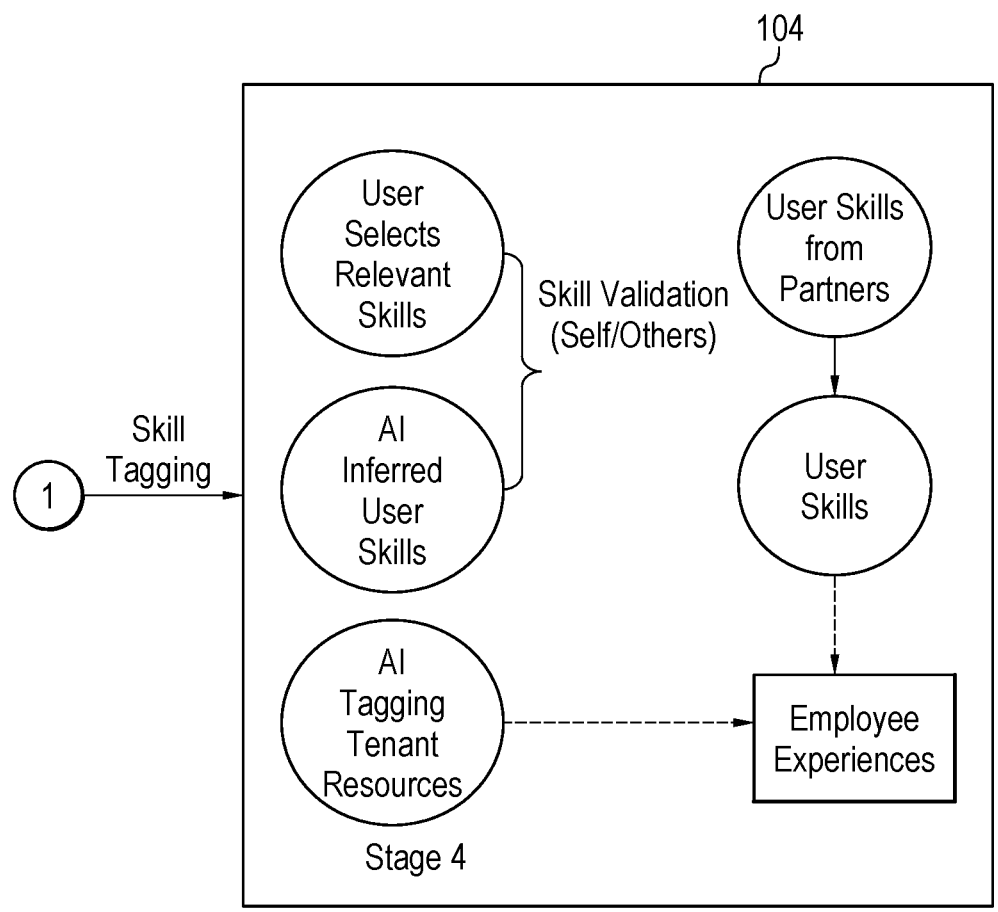

FIGS. 1A and 1B are a schematic view depicting several conventional skills management solutions. Specifically, FIGS. 1A and 1B show an "Out of Box" (OOB) skills ontology solution 100, a tenant skills ontology solution 102, and a user experience solution 104. The OOB skills ontology solution 100 involves building an OOB skills ontology. For this solution, skills are extracted and mapped using AI models to generate an OOB skills graph that is scalable and maintainable. The tenant skills ontology solution 102 involves building a tenant-level skills ontology on top of an OOB skills ontology. For this solution, skills management providers offer APIs that take tenant skills lists and/or tenant-specific resources as input and then build the relevant tenant-level skills ontology on top of the provider's OOB skills ontology. Moreover, the user experience solution 104 involves surfacing relevant employee experiences. For this solution, resources in the provider's system are tagged with the skills ontology to surface employee experiences and insights.

Turning now to more specific details of the three skills management solutions that typically exist in the market today, the OOB skills ontology solution 100 includes two stages 106 and 108. During the first stage 106, skills are extracted on a constant basis to generate an OOB skills list. In particular, skills are typically extracted by scraping text documents, such as resumes and job descriptions, to determine relevant skills. During the second stage 108, the OOB skills ontology is created, generating an OOB skills graph. The OOB skills graph is used to define the relationships between the skills, where every skill is a node that connects to one or more other nodes. Moreover, every time a new skills list is input, the new skills list is mapped into the OOB skills graph.

The tenant skills ontology solution 102 also typically includes two stages 110 and 112. In particular, during the first stage 110, a previously-generated OOB skills ontology (such as the one generated via the OOB skills ontology solution 100) is filtered by industry and is used as the starting point for skills management for most organizations, especially organizations that do not maintain their own tenant skills lists. During the second stage 112, the skills ontology evolves using the tenant skills list for a particular tenant (e.g., organization), resulting in the generation of a tenant skills ontology on top of the OOB skills ontology. The generated tenant skills ontology is highly relevant to the particular tenant and is designed to serve the tenant's specific business needs, such as those defined based on tenant resources (e.g., job titles and the like).

Finally, the user experience solution 104 involves using a previously-generated tenant skills ontology (such as the one generated via the tenant skills ontology solution 102) to tag tenant-specific resources, such as jobs, feedback, documents, and the like, using AI techniques. In addition, this stage involves performing AI-inferred tagging of user skills, as well as allowing the user to select relevant skills. The AI-inferred and user-selected skills may then go through a skill validation process in which the user validates/invalidates the AI-inferred skills and other users validate/invalidate the user-selected skills. In addition, in some cases, partners are able to define user skills. This results in the generation of user skills lists, which can then be used to provide skills-related employee experiences.

However, these conventional skills management solutions suffer from several drawbacks. In particular, providers are still finding it difficult to provide value to organizations and to drive engagement using such approaches. There are several reasons for this. First, organizations do not just need relevant skills ontology to tag resources in one provider's system. Instead, organizations need a relevant skills ontology to consistently tag resources across all relevant resources. However, most providers only offer walled-garden solutions to organizations. This results in resources being tagged differently by different systems, creating inconsistencies in surfacing relevant resources in employee experiences. For instance, one system may tag an item as "teamwork," while another system may tag the same item as "partnership." Now, if an employee searches for a skill term "collaboration," none of these items will surface.

Second, employees want a holistic experience that covers all their needs and is purpose-built and simple to use. In general, today's employees are forced to use multiple fragmented HR systems. It would be much more convenient for employees to access the relevant resources in a seamless way, irrespective of fragmented HR systems, to let them execute to their full potential and stay productive.

Therefore, the present techniques solve this issue by providing a centralized skills management system that enables consistent, standardized skill tagging across diverse tenant resources (e.g., content, documents, positions, user profiles, learning paths, and the like) and across multiple provider objects in the tenant's ecosystem. Moreover, such tenant-level standardized skill tagging can be performed both in the flow of work and outside the flow of work, e.g., using standard tenant-specific data objects generated during the normal course of work and nonstandard tenant-specific data objects generated outside the normal course of work. In this manner, the present techniques enable the surfacing of simple, intuitive, and holistic skills-related employee experiences that span across diverse tenant-level data sources and providers.

The centralized skills management system described herein provides numerous advantages as compared to previous skills management solutions. As an example, the centralized skills management system provides a centralized skills ontology that is continuously updated and maintained and is highly relevant to a large number of different tenants and industries. As another example, the centralized skills management system can be automatically utilized by tenants with very little manual intervention. As another example, the architecture behind the centralized skills management system is readily scalable to large enterprise customers with diverse resources that are distributed across multiple HR solutions or providers. As another example, new tenants can be quickly integrated into the centralized skills management system, providing fast and efficient positive outcomes for such tenants. As another example, the centralized skills management system is designed to adapt with the ever-evolving skills market, with the expectation that skills will be continuously added and/or modified. As yet another example, the centralized skills management system connects resources and data across various providers to enable individual employees, as well as organizations as a whole, to seamlessly pursue their skills-related goals without accessing multiple fragmented systems.

As an example, consider an organization that utilizes System 1 for hiring, System 2 for learning, and System 3 for human capital management (HCM). According to current techniques, users associated with such organization are unable to effectively discover skills-relevant jobs, learning, connections, and the like in a coherent way through a single skills language. Therefore, embodiments described herein provide for the standardized skill tagging of various tenant resources, such as, for example, jobs, learning content, teams, communities, mentors, and the like, using the single standardized skill graph so that such discovery can happen both in the flow of work and outside the flow of work.

According to embodiments described herein, the centralized skills management system accomplishes the aforementioned goals by solving the core problem of fragmentation within the skills management domain. This is achieved, at least in part, by providing systems and methods for consistent, standardized skill tagging of tenant-level data objects using skills-related terms that define a universal skills language. Such standardized skill tagging is enabled using skills obtained from a global skills graph in combination with data objects obtained from a property graph that includes content relating to a large number of diverse users and providers (e.g., application service providers) relating to the particular tenant.

One non-limiting example of a suitable global skills graph is the LinkedIn® Skills Graph, which is maintained by LinkedIn Corporation. The LinkedIn® Skills Graph is a global skills graph that forms a large-scale skills taxonomy with over 36,000 skills. The skills within the LinkedIn® Skills Graph are defined, updated, and maintained within the context of LinkedIn's professional networking environment, which supports over 24 million job postings and over 740 million members.

Figure 2:
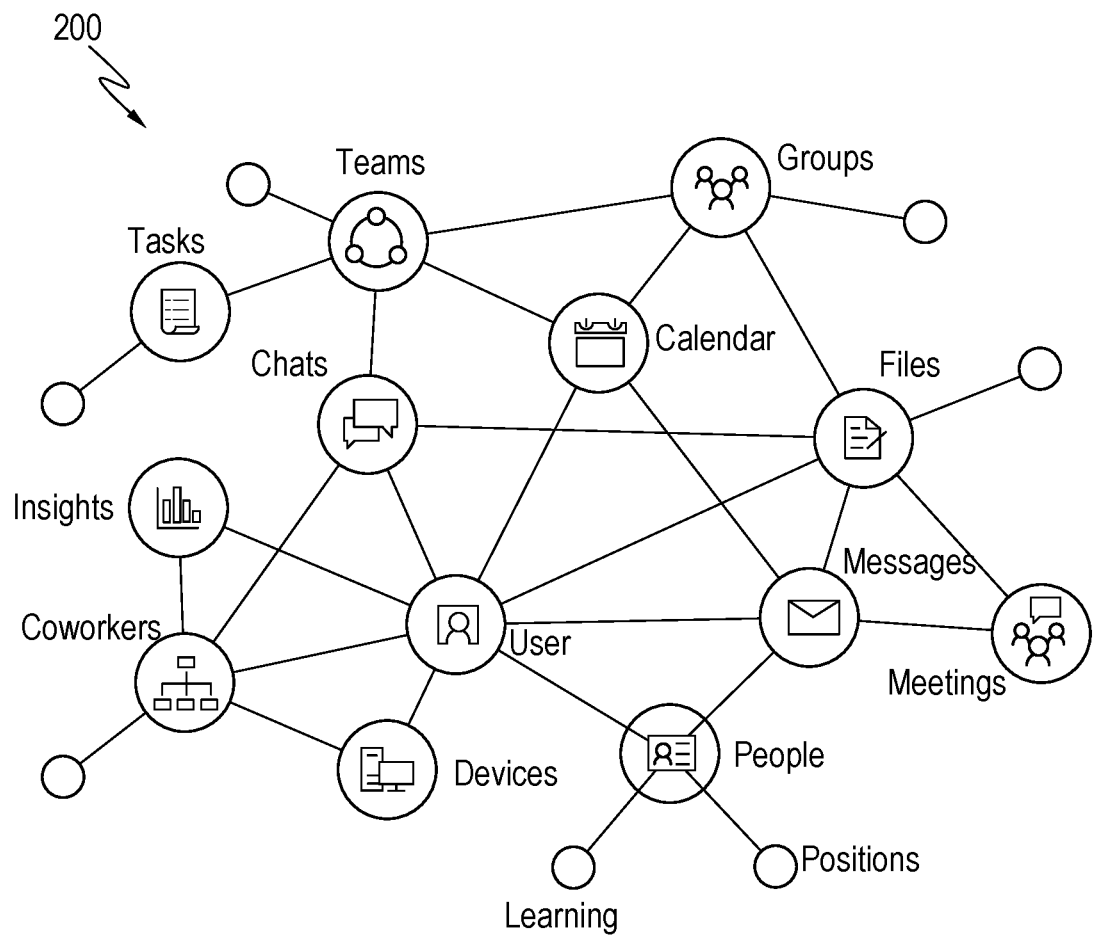
FIG. 2 is a simplified schematic view of Microsoft® Graph.

In addition, one non-limiting example of a suitable property graph that may be utilized according to embodiments described herein is Microsoft® Graph, which is provided by Microsoft Corporation. FIG. 2 is a simplified schematic view of Microsoft® Graph 200. As shown in FIG. 2, Microsoft® Graph 200 is a large property graph that includes the data underlying various Microsoft® applications and services, including (but not limited to) the suite of Microsoft 365® applications. Such applications include Microsoft® Viva®, Microsoft® Excel®, Microsoft® Word®, Microsoft® Teams®, Microsoft® PowerPoint®, Microsoft® Outlook®, Microsoft® OneNote®, Microsoft® OneDrive®, Microsoft® SharePoint®, and Microsoft® Yammer® (among others). Microsoft® Graph 200 also includes data that forms the backbone of Microsoft's cloud computing platform, Microsoft® Azure®. Moreover, the data within Microsoft® Graph 200 may be accessed and utilized to build new applications and/or to expand existing applications. Such functionality is provided via a corresponding API, which is generally referred to as the Microsoft® Graph API and is currently accessible at graph.microsoft.com.

As shown in FIG. 2, a property graph, such as Microsoft® Graph 200, includes data about various types of tenant resources. Such data may include, for example, data objects relating to users, teams, chats, tasks, insights, coworkers, groups, calendars, files, messages, meetings, people, devices, learning, and positions. Such data may be viewed from the perspective of the corresponding tenant and/or from the perspective of a specific user (e.g., a manager or employee) associated with the corresponding tenant.

Within a property graph, such as Microsoft® Graph 200, such data objects are represented as nodes. The relationships and/or interactions between the data objects are then represented using edges that connect the nodes within the property graph. As a few non-limiting examples, edges in the property graph might indicate that a particular user modified a particular document, that a particular user is working with another user, that certain resources are popular with particular users, that a particular tenant includes a specific organizational structure, that a tenant is searching for candidates for a particular position, and/or that a particular user is learning about a certain topic.

Furthermore, it should be noted that Microsoft® Graph 200 is not limited to data obtained from Microsoft® applications and services. Rather, techniques exist to enable third-party application providers to incorporate their own data into Microsoft® Graph. In some cases, this is achieved using an "owner+decorator" model, in which a given resource or entity in the property graph is mastered by one provider (e.g., Microsoft®) and then "decorated" with additional data by other third-party application providers. However, regardless of the technique utilized to incorporate such third-party data, the resulting property graph includes a wide variety of data objects that span across a wide variety of providers.

Turning now to exemplary details of the standardized skill tagging techniques described herein, such standardized skill tagging may be performed by accessing the property graph for a particular tenant and extracting skills-related terms from the object metadata corresponding to the data objects within the property graph. More specifically, in various embodiments, the skill-tag standardizer described herein obtains the skills-relevant object metadata through a set of APIs, e.g., by taking either text or other object identifiers or object properties in the property graph as the input. Exemplary types of data objects that may be input to the skill-tag standardizer for a particular user include (but are not limited to): (1) key phrases (extracted knowledge) from e-mails, public chats, documents, and the like, which capture the user's presence in the property graph; (2) text data found in the corresponding user profile (e.g., the Microsoft 365® user profile); and (3) signals received regarding trainings undertaken within an application, such as an employee experience application (e.g., within a "Viva Learning" portion of Microsoft® Viva®), and other such skills-related actions. Additional exemplary types of data objects that may be input to the skill-tag standardizer for the particular tenant include (but are not limited to): (1) text data corresponding to job descriptions, course descriptions, and the like; and (2) data relating to which users in the property graph engage with particular data objects (e.g., the skills of the members of a particular Microsoft® Teams® team or a particular Microsoft® Yammer® community can be aggregated and used as an input to the skill-tag standardizer). In general, it should be noted that, while such data objects are primarily described herein with reference to the "object metadata," the term "object metadata" as used herein is intended to be inclusive of other features and properties of the corresponding data objects. Generally, the skill-tag standardizer described herein is configured to skill-tag any type of tenant-level data object that exists within the property graph, as long as such data object encompasses one or more skills-related terms. Furthermore, in various embodiments, the extraction of the skills-related terms from the object metadata may be accomplished, at least in part, using AI-based techniques, such as, for example, natural language processing (NLP) techniques.

In some embodiments, the skill-tag standardizer then anonymizes the aggregated object metadata to protect tenant and user privacy. According to embodiments described herein, the skill-tag standardizer then interfaces or communicates with the global skills graph provider (e.g., LinkedIn) via one or more APIs and transmits the aggregated skills object metadata to the global skills graph provider. The global skills graph provider then maps the skills-related terms from the object metadata to one or more standardized skill tags within the global skills graph, where each standardized skill tag may include a skill identification (ID) that maps to various skills-related terms. Moreover, the standardized skill tags may also be cross-correlated with each other based on overlapping and/or similar skills-related data, thus generating lists of related standardized skill tags.

The skill-tag standardizer then imports the relevant standardized skill tags from the global skills graph and incorporates the standardized skill tags into the object metadata for the corresponding data objects within the property graph. In this manner, the present techniques enable the standardized skill-tagging of all the tenant-level data objects within the property graph according to a single, universal skills language that defines consistent, canonical representation of skills.

In some embodiments, the standardized skill tagging techniques described herein are provided, at least in part, within the context of an employee experience application or platform, such as, for example, Microsoft® Viva®. In particular, the utilization of standardized skill tags across a wide variety of tenant resources and providers effectively provides a universal skills language that enables employees to seamlessly access skills-based tools and experiences within the context of a single, overarching employee experience application, thus solving the core problem of fragmentation within the skills management domain. In various embodiments, this feature enables the goal of the employee experience application (e.g., Microsoft® Viva®) to provide an experience layer that is tailored to the employee and that abstracts away the seams between disparate systems and tools.

It should be noted that the term "employee experience application" is used herein to refer to any suitable type of web-based application that provides relevant services to users associated with particular tenants. Thus, while Microsoft® Viva® is used as an example of a suitable employee experience application, those skilled in the art will appreciate that the present techniques are not limited to Microsoft® Viva®. Instead, the present techniques can be applied to a wide range of tenant-oriented applications that provide various functionalities to employees, administrators, managers, owners, and/or others associated with the tenant. Non-limiting examples of such functionalities include services relating to personal development, career advancement, job searching, job retention, networking, team hiring, onboarding, assignment planning/staffing, organization transformation, talent deployment, leadership hiring/succession planning, mergers and acquisitions, and the like.

Figure 3:
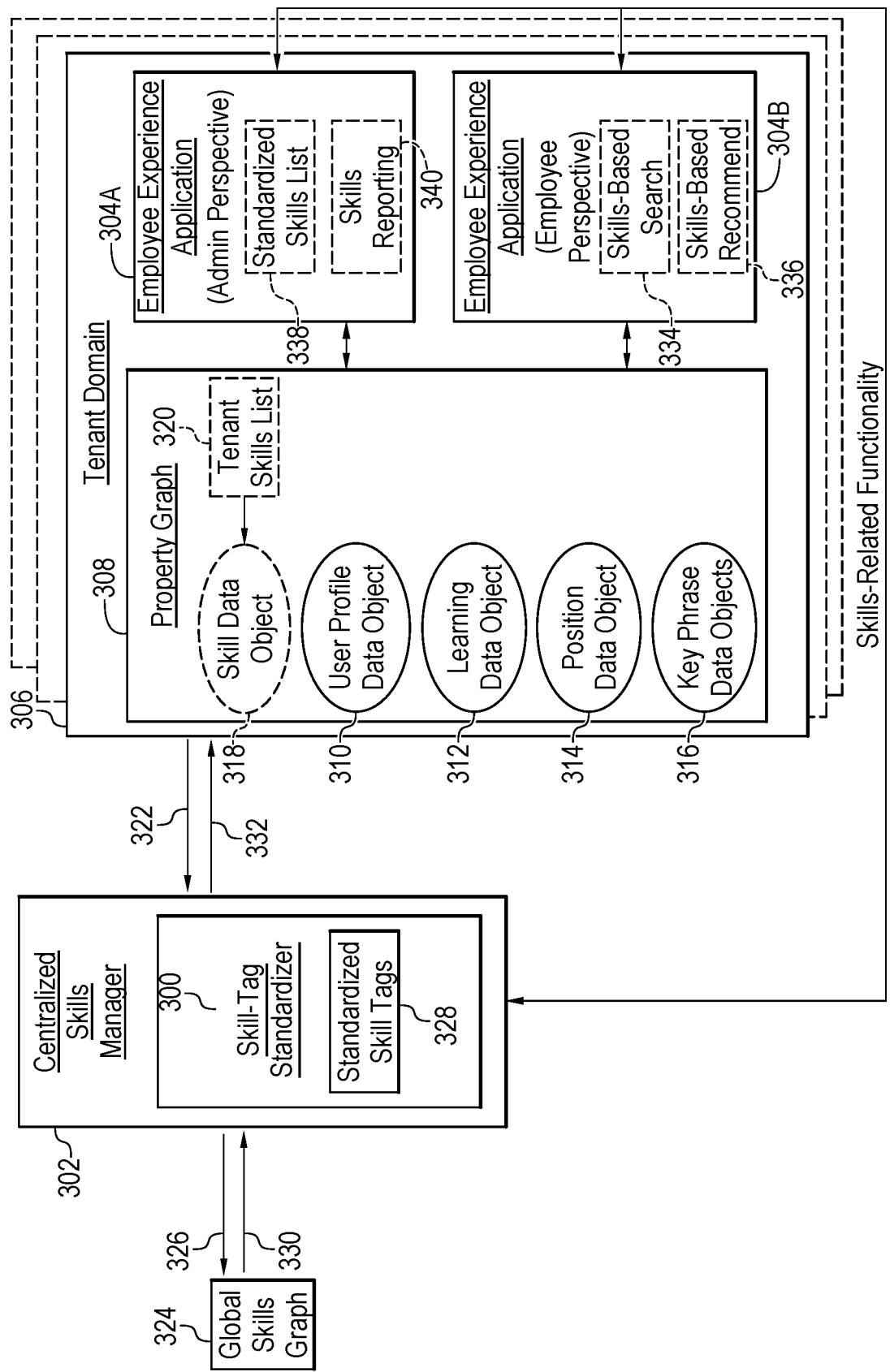
FIG. 3 is a schematic view depicting the manner in which skill tags can be standardized using a skill-tag standardizer of a centralized skills manager according to embodiments described herein.

FIG. 3 is a schematic view depicting the manner in which skill tags can be standardized using a skill-tag standardizer 300 of a centralized skills manager 302 according to embodiments described herein. In some embodiments, the centralized skills manager 302 and the corresponding skill-tag standardizer 300 are provided as program modules (e.g., a centralized skills management module and one or more corresponding sub-modules, including the skill-tag standardization sub-module described herein) located in one or more computer-readable storage media, as described further herein. Moreover, such program modules may be executed within the context of one or more computing systems, network environments, and/or distributed computing environments, as described further herein. As a non-limiting example, the centralized skills manager 302 and the skill-tag standardizer 300 may be executed by one or more processors corresponding to one or more centralized skills management servers that are operated by a centralized skills management provider. Furthermore, in some embodiments, the centralized skills management server(s) are the same as, integrated with, or otherwise associated with one or more employee experience application servers, which are configured to provide for execution of an employee experience application 304 within various tenant domains.

As shown in FIG. 3, the skill-tag standardizer 300 is configured to access data existing within a tenant domain 306 corresponding to a particular tenant, including an overarching property graph 308, such as Microsoft® Graph, that corresponds to the tenant. The property graph 308 includes tenant-level data objects, such as, for example, user profile data objects 310, learning data objects 312, position data objects 314, and key phrase data objects 316. Additional exemplary data objects that are not mentioned in FIG. 3 but can be accessed to be tagged include, but are not limited to, file data objects (e.g., extracted from Microsoft® Word®), calendar data objects (e.g., extracted from Microsoft® Outlook®), event data objects, task data objects, planning data objects, note data objects (e.g., extracted from Microsoft® OneNote®), group data objects (e.g., extracted from Microsoft 365® Groups, Yammer® Groups and/or Microsoft® Teams® team/channel data objects), job role data objects, onboarding path data objects, and topic data objects. Moreover, as additional data objects (and types of data objects) are accessed and tagged with standardized skill tags, richer employee experience scenarios can be provided for the user.

In addition, the property graph 308 may optionally include skill data objects 318, which may be based on one or more tenant skills lists 320 that have been generated and/or maintained at the tenant level. Specifically, in various embodiments, the tenant skills list(s) 320 include one or more tenant-specific skills libraries that are provided in a pre-defined format. The skill data objects 318 corresponding to the tenant skills lists 320 are then created within the property graph, enabling the tenant-specific skills to be tagged with one or more standardized skill tags according to embodiments described herein.

In various embodiments, at least a portion of the data within the tenant domain 306 is retrieved from one or more existing HR systems (e.g., through corresponding APIs) and then imported into the property graph 308. In this manner, the skill-tag standardizer 300 is able to incorporate skills-related data, not only from various data sources corresponding to the tenant, but also from a large number of different providers that offer skills libraries/services (and/or other types of services) to the tenant.

In various embodiments, once the skill-tag standardizer 300 accesses the property graph 308, the skill-tag standardizer 300 aggregates and exports the object metadata corresponding to the data objects (e.g., the data objects 310, 312, 314, 316, and/or 318) within the property graph 308, as indicated by arrow 322. The skill-tag standardizer 300 then extracts skills-related terms from the object metadata.

The skill-tag standardizer 300 then interfaces with a global skills graph 324 that includes a dynamic, regularly-updated skills taxonomy, as described above with respect to the LinkedIn® Skills Graph, for example. More specifically, the skill-tag standardizer 300 interfaces or communicates with the global skills graph 324 via one or more skill finder APIs, as indicated by arrow 326. During such interfacing, the skill-tag standardizer communicates the skills-related terms to the global skill graph provider, and the global skills graph provider returns a list of standardized skill tags 328 corresponding to the skills-related terms, as indicated by arrow 330. Moreover, in some embodiments, each standardized skill tag 328 within the list also includes one or more corresponding skill identifications (IDs), which are identifiable skill numbers for the standardized skill tag 328, and/or one or more skill aliases, which are related skill terms that provide for enhanced search capabilities with respect to the standardized skill tag 328.

In various embodiments, the skill-tag standardizer 300 then incorporates (or appends) the standardized skill tags 328 into the corresponding object metadata for the data objects (e.g., the data objects 310, 312, 314, 316, and/or 318) within the property graph 308, as indicated by arrow 332. In this manner, the data objects within the property graph 308 are skill-tagged according to a single, universal skills language. Furthermore, in various embodiments, the skill-tag standardizer 300 is further configured to continuously (or intermittently) repeat this process to skill-tag new (or modified) data objects within the property graph 308. In this manner, the standardized skill tags within the property graph 308 are continuously (or intermittently) updated, expanded, and maintained to account for the current skills market as evidenced from a wide variety of tenant resources and across any number of different providers.

According to embodiments described herein, the centralized skills manager 302 provides enhanced skills-related functionality, both at the employee level (e.g., as viewed from the perspective of an employee) and the overall tenant level (e.g., as viewed from the perspective of an admin, manager, or the like). In particular, once the tenant-level data objects have been tagged (or stamped) with the standardized skill tags 328, the centralized skills manager 302 is configured to provide enhanced skills-related experiences. As an example, the centralized skills manager 302 may utilize the data objects (e.g., the data objects 310, 312, 314, 316, and/or 318) with the incorporated standardized skill tags 328 to provide a skills-based search functionality 334 and/or a skills-based recommendation functionality 336 to an employee during execution of the employee experience application 304B on the employee's computing system. As another example, the centralized skills manager 302 may utilize the data objects (e.g., the data objects 310, 312, 314, 316, and/or 318) with the incorporated standardized skill tags 328 to provide a standardized skills list functionality 338 and/or a skills reporting functionality 340 to an admin/manager during execution of the employee experience application 304A on the admin/manager's computing system.

Furthermore, those skilled in the art will appreciate that the implementation of the skill-tag standardizer 300 shown in FIG. 3 is for illustrative purposes only, and the exact implementation of the standardized skill tagging techniques described herein may vary depending on the details of the particular implementation. For example, in some embodiments, the centralized skills manager 302 and skill-tag standardizer 300 are provided by a web-based employee experience application provider. In such embodiments, the standardized skill tags 330 are directly utilized by the employee experience application provider to surface enhanced skills-based employee experiences during execution of the web-based employee experience application on various remote computing systems.

The following is a description of several exemplary implementations of the standardized skill tagging techniques described herein for particular use-case scenarios. Those skilled in the art will appreciate that these exemplary implementations are for illustrative purposes only. In practice, the standardized skill tagging techniques described herein may be implemented in any other suitable manner to achieve any other suitable results, depending on the details of the particular implementation.

Figure 4A:
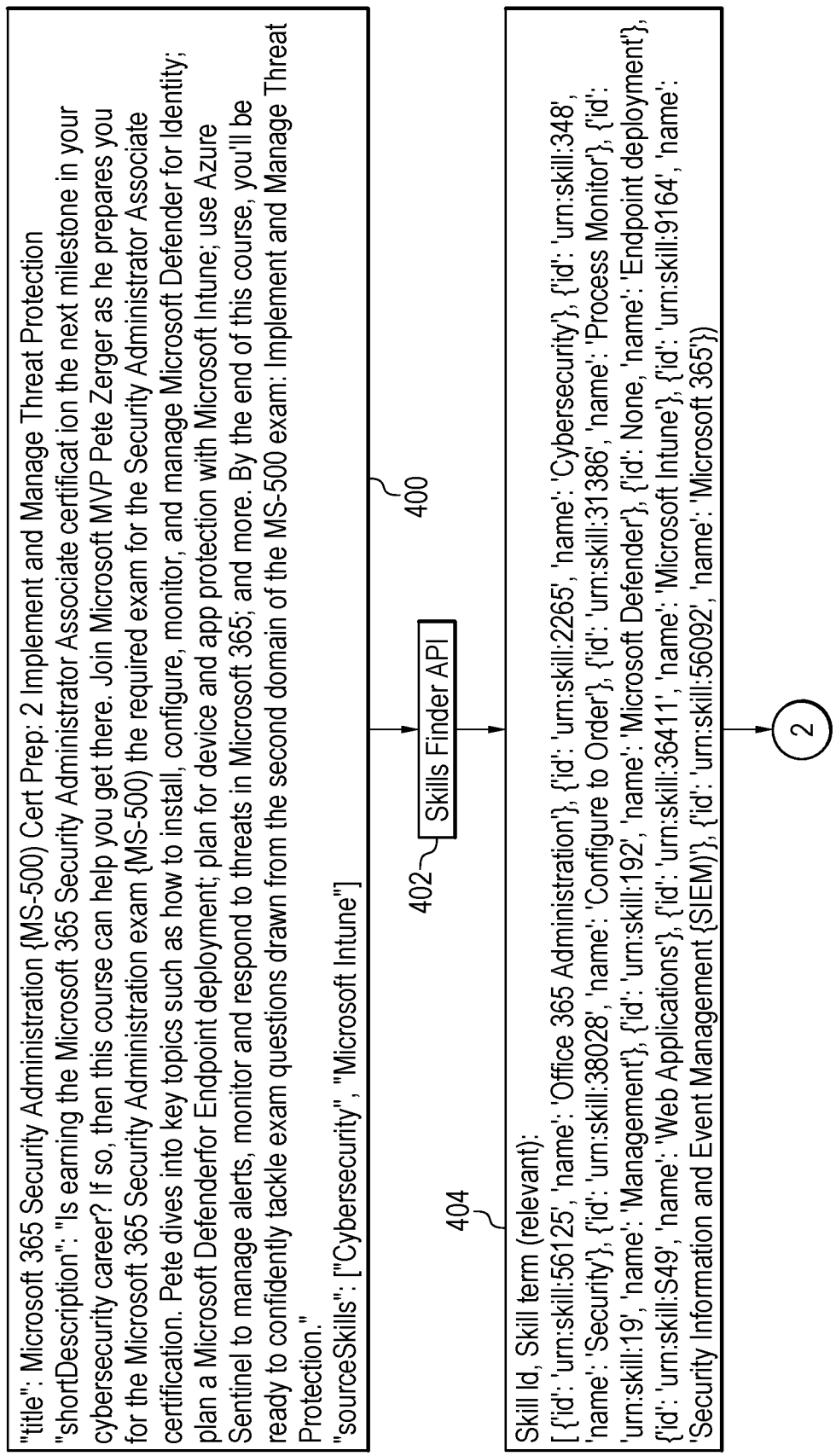
FIGS. 4A and 4B are a process flow diagram showing an exemplary implementation in which the skill-tag standardizer is utilized to tag a learning data object with standardized skill tags.
Figure 4B:
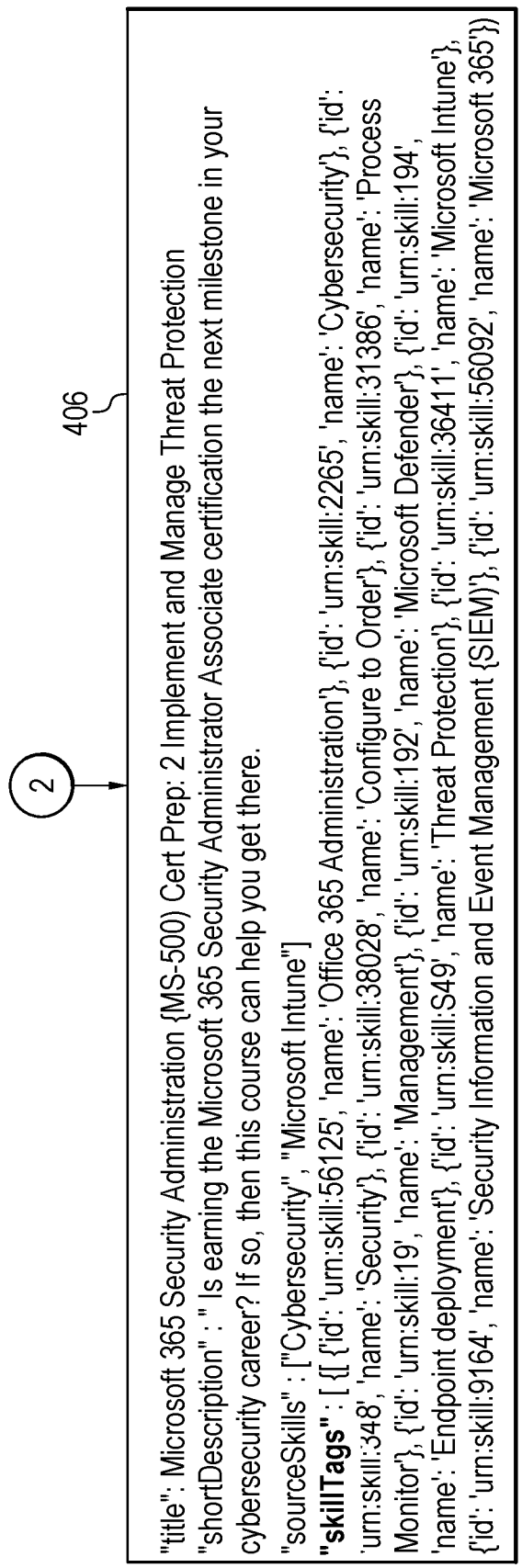

FIGS. 4A and 4B are a process flow diagram showing an exemplary implementation in which the skill-tag standardizer is utilized to tag a learning data object 400 with standardized skill tags. As shown in FIG. 4A, the learning data object 400 includes object metadata, such as, for example, a title, description, skill-related terms, and the like. According to embodiments described herein, the skill-tag standardizer extracts the skills-related term from such object metadata and then interfaces with the skills finder API 402 corresponding to the global skills graph to determine standardized skill tags 404 related to such object metadata. Next, the skill-tag standardizer incorporates the standardized skill tags 404 into the object metadata, generating a modified learning data object 406 with the standardized skill tags stamped onto (or embedded within) the object metadata, as shown in FIG. 4B. In this manner, the skill-tag standardizer tags the learning data object 400 with relevant skills that are defined based on a universal skills language.

Figure 5A:
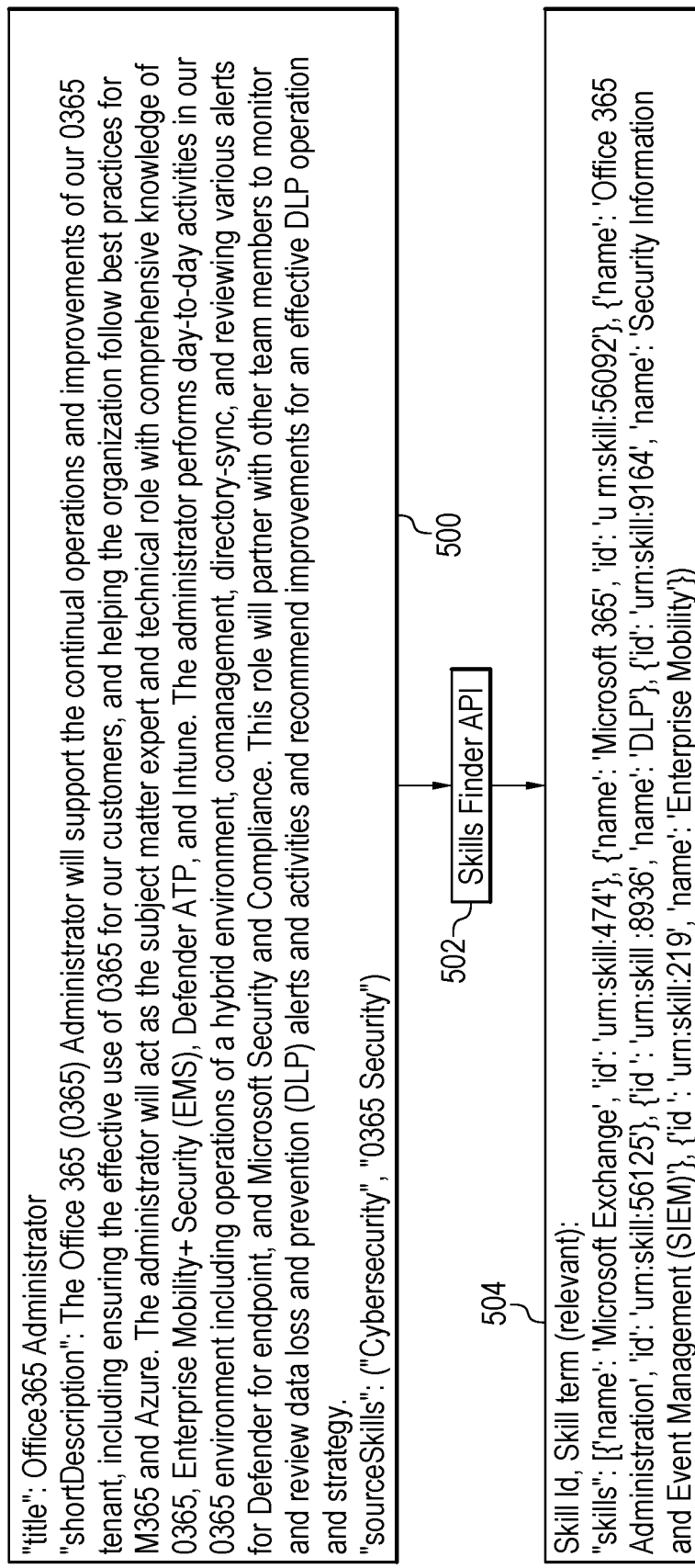

FIGS. 5A and 5B are a process flow diagram showing an exemplary implementation in which the skill-tag standardizer is utilized to tag a position data object 500 with standardized skill tags. Similarly to the exemplary implementation of FIGS. 4A and 4B, the position data object 500 includes object metadata, such as, for example, a title, description, skill-related terms, and the like, as shown in FIG. 5A. According to embodiments described herein, the skill-tag standardizer extracts the skills-related terms from such object metadata and then interfaces with the skills finder API 502 corresponding to the global skills graph to determine standardized skill tags 504 related to such object metadata. Next, the skill-tag standardizer incorporates the standardized skill tags 504 into the object metadata, generating a modified position learning data object 506 with the standardized skill tags stamped onto (or embedded within) the object metadata, as shown in FIG. 5B. In this manner, the skill-tag standardizer tags the position data object 500 with relevant skills that are defined based on a universal skills language.

Figure 6:
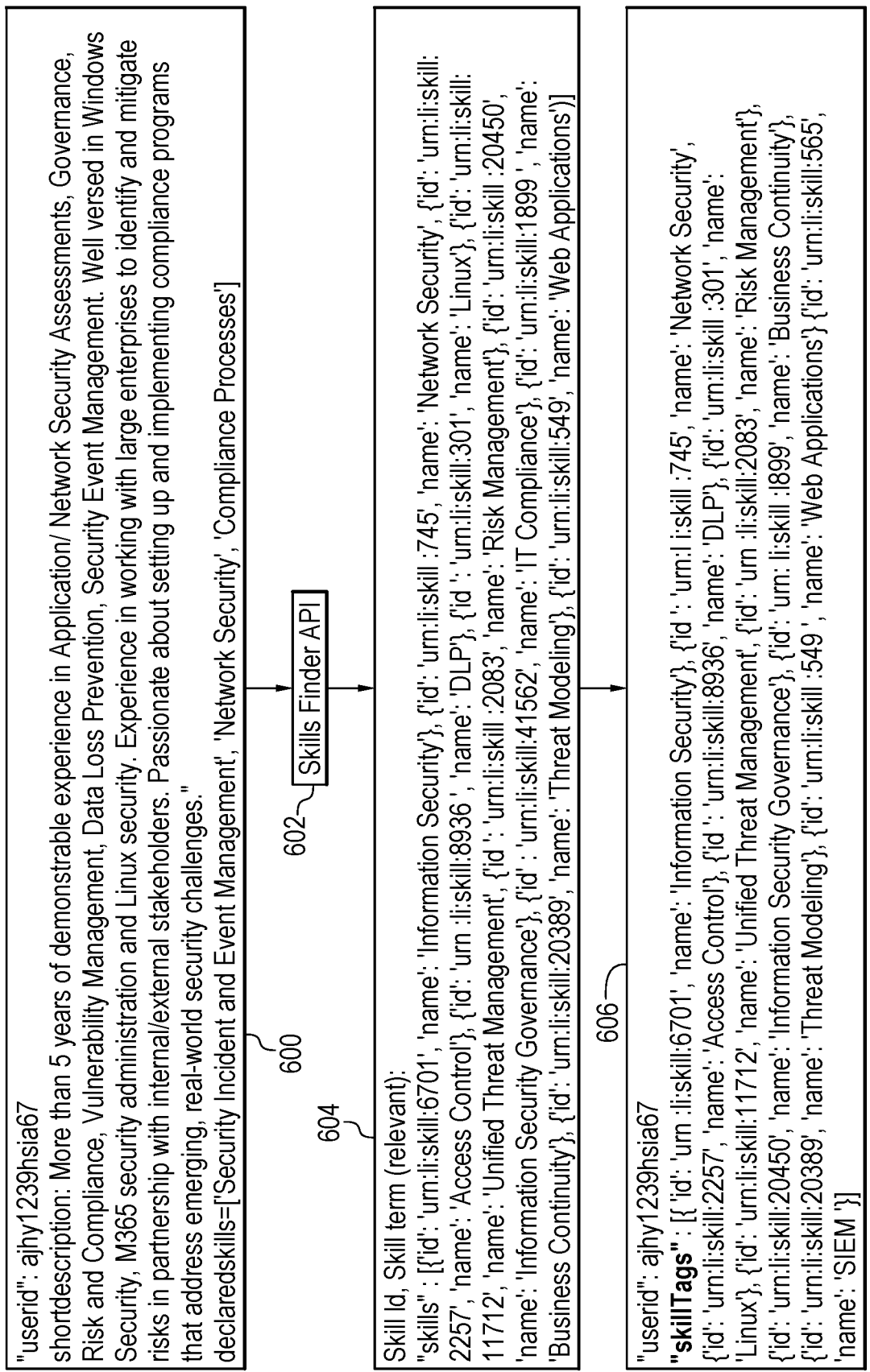
FIG. 6 is a process flow diagram showing an exemplary implementation in which the skill-tag standardizer is utilized to tag a user profile data object with standardized skill tags.

FIG. 6 is a process flow diagram showing an exemplary implementation in which the skill-tag standardizer is utilized to tag a user profile data object 600 with standardized skill tags. Similarly to the exemplary implementations of FIGS. 4A, 4B, 5A, and 5B, the user profile data object 600 includes object metadata, such as, for example, a user ID, description, declared skill-related terms, and the like. According to embodiments described herein, the skill-tag standardizer extracts the skills-related terms from such object metadata and then interfaces with the skills finder API 602 corresponding to the global skills graph to determine standardized skill tags 604 related to such object metadata. Next, the skill-tag standardizer incorporates the standardized skill tags 604 into the object metadata, generating a modified user profile data object 606 with the standardized skill tags stamped onto (or embedded within) the object metadata. In this manner, the skill-tag standardizer tags the user profile data object 600 with relevant skills that are defined based on a universal skills language.

Figure 7:
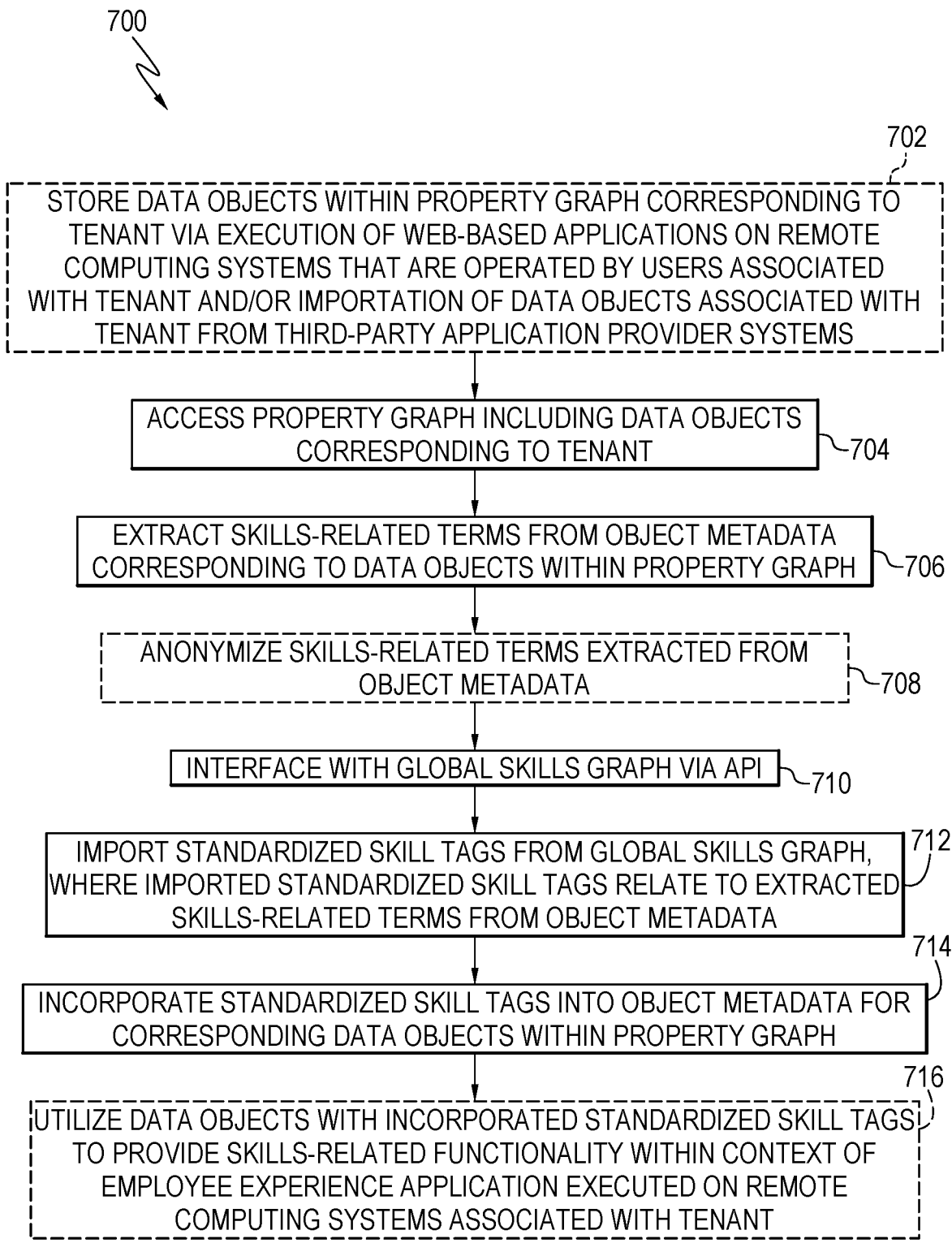
FIG. 7 is a process flow diagram of a method for standardized skill tagging according to embodiments described herein.

FIG. 7 is a process flow diagram of a method 700 for standardized skill tagging according to embodiments described herein. The method 700 is executed via one or more computing systems, such as the exemplary computing system described with respect to FIG. 8. The computing system(s) include one or more processors and one or more computer-readable storage media including computer-executable instructions that, when executed by the processor(s), cause the processor(s) to perform the blocks of the method 700. An exemplary embodiment of such computer-readable storage media is described with respect to FIG. 10. Moreover, in various embodiments, the method 700 is executed within the context of a network environment including one or more centralized skills management system(s)/server(s), as described further with respect to the exemplary network environment of FIG. 9.

The method 700 may begin at optional block 702, at which data objects are stored within a property graph corresponding to a particular tenant by: (1) executing web-based applications on remote computing systems that are operated by users associated with the tenant and storing application data objects generated during the execution of the web-based applications as at least a portion of the data objects within the property graph; and/or (2) importing third-party data objects associated with the tenant from third-party application provider systems and storing the imported third-party data objects as at least a portion of the data objects within the property graph. In this manner, various types of tenant-level data objects may be stored to create and/or expand on the tenant-specific property graph. Moreover, those skilled in the art will appreciate that tenant-specific data objects may also be obtained from any other suitable sources, depending on the details of the particular implementation.

At block 704, the property graph including the data objects corresponding to the tenant is accessed via the processor of the computing system implementing the method 700. In various embodiments, the data objects include one or more user profile data objects, one or more learning data objects, one or more position data objects, and/or one or more key phrase data objects. Moreover, in some embodiments, the data objects also include skill data objects that are generated based on one or more tenant skills lists relating to the tenant.

At block 706, skills-related terms are extracted from object metadata corresponding to the data objects within the property graph. In various embodiments, this is accomplished, at least in part, using AI-based techniques. At optional block 708, the skills-related terms extracted from the object metadata are then anonymized to protect the privacy of the tenant and the users associated with the tenant.

At block 710, an API is used to interface with a global skills graph, as described herein. At block 712, standardized skill tags are imported from the global skills graph, where the imported standardized skill tags relate to the extracted skills-related terms from the object metadata. Next, at block 714, the standardized skill tags are incorporated into the object metadata for the corresponding data objects within the property graph.

At optional block 716, the data objects with the incorporated standardized skill tags are utilized to provide one or more skills-related functionalities within the context of one or more employee experience applications executed on one or more remote computing systems associated with the tenant. Such skills-related functionalities may include, but are not limited to, generating skills reports for the tenant, generating a standardized skills list for the tenant, providing skills-based search capabilities for the tenant's employees, and/or providing skills-based inference capabilities for the tenant's employees.

The block diagram of FIG. 7 is not intended to indicate that the blocks of the method 700 are to be executed in any particular order, or that all of the blocks of the method 700 are to be included in every case. Moreover, any number of additional blocks may be included within the method 700, depending on the details of the specific implementation. For example, in some embodiments, the method 700 also includes updating the standardized skill tags within the global skills graph using the skills-related terms from the object metadata. In this manner, the universal skills language defined by the global skills graph is continuously updated and maintained based on up-to-date skills information obtained from the property graphs of various tenants.

Figure 8:
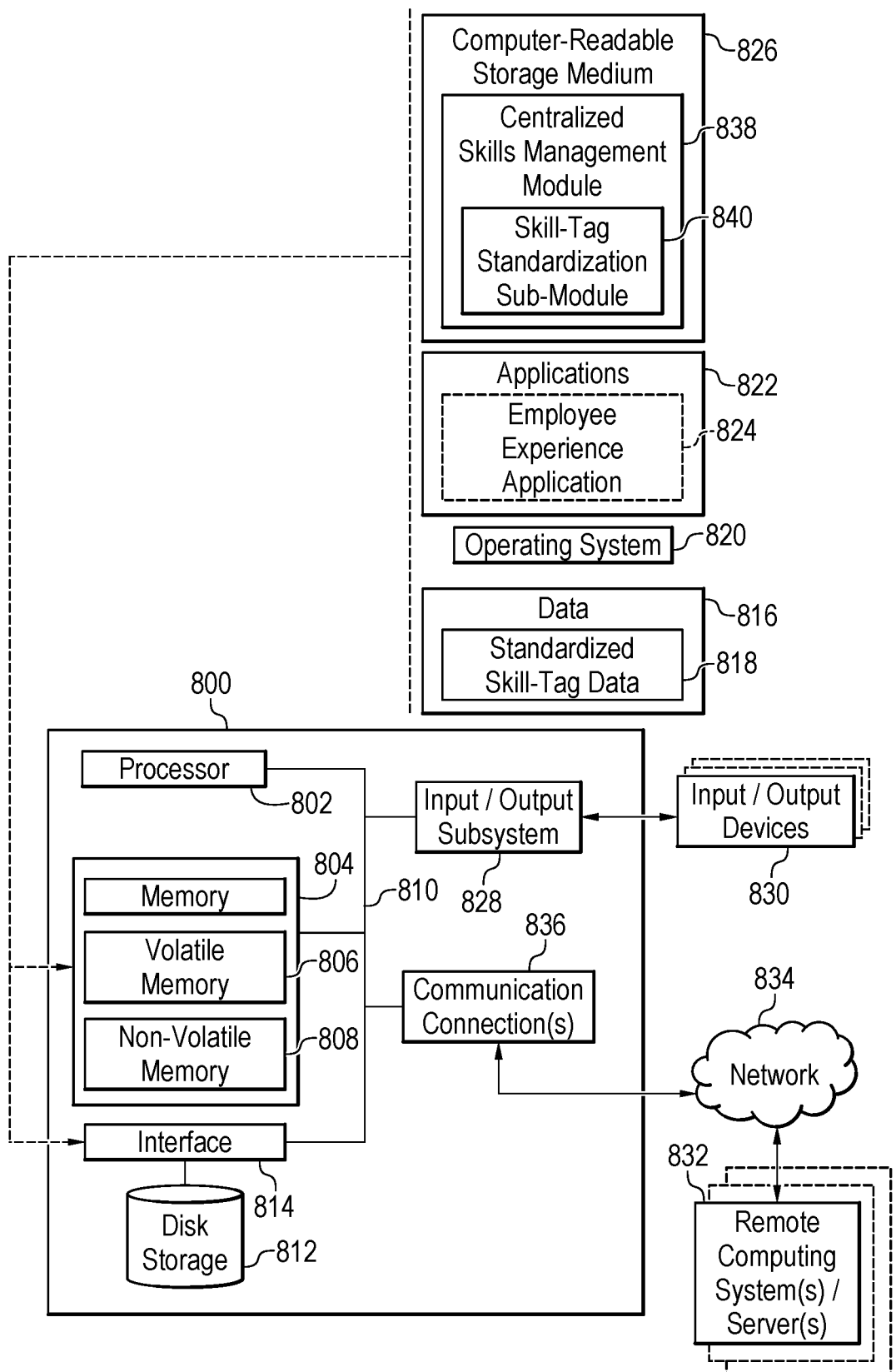
FIG. 8 is a block diagram of an exemplary computing system for implementing the standardized skill tagging techniques described herein.

FIG. 8 is a block diagram of an exemplary computing system 800 for implementing the standardized skill tagging techniques described herein. The exemplary computing system 800 includes a processor 802 and a memory 804. The processor 802 may include any suitable type of processing unit or device, such as, for example, a single-core processor, a multi-core processor, a computing cluster, or any number of other configurations. Moreover, the processor 802 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 804 typically (but not always) includes both volatile memory 806 and non-volatile memory 808. The volatile memory 806 retains or stores information so long as the memory is supplied with power. By contrast, the non-volatile memory 808 is capable of storing (or persisting) information even when a power supply is not available. The volatile memory 806 may include, for example, RAM (e.g., synchronous RAM (SRAM), dynamic RAM (DRAM), synchronous dynamic RAM (SDRAM), and the like) and CPU cache memory. The nonvolatile memory 808 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 802 and the memory 804, as well as other components of the computing system 800, are interconnected by way of a system bus 810. The system bus 810 can be implemented using any suitable bus architecture known to those skilled in the art.

According to the embodiment shown in FIG. 8, the computing system 800 also includes a disk storage 812. The disk storage 812 may include any suitable removable/non-removable, volatile/non-volatile storage component or device. For example, the disk storage 812 may include, but is not limited to, a magnetic disk drive, floppy disk drive, tape drive, Jaz drive, Zip drive, LS-210 drive, flash memory card, memory stick, or the like. In addition, the disk storage 812 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 812 to the system bus 810, a removable or non-removable interface is typically used, such as interface 814 shown in FIG. 8.

In various embodiments, the disk storage 812 and/or the memory 804 function as one or more databases that are used to store data 816 relating to the techniques described herein. Such data 816 include, but are not limited to, standardized skill-tag data 818 generated according to embodiments described herein.

Those skilled in the art will appreciate that FIG. 8 describes software that acts as an intermediary between a user of the computing system 800 and the basic computing resources described with respect to the operating environment of the computing system 800. Such software includes an operating system 820. The operating system 820, which may be stored on the disk storage 812, acts to control and allocate the computing resources of the computing system 800. Moreover, system applications 822, including, for example, the employee experience application 824 described herein, take advantage of the management of the computing resources by the operating system 820 through one or more program modules stored within a computer-readable storage medium (or media) 826, as described further herein.

The computing system 800 also includes an input/output (I/O) subsystem 828. The I/O subsystem 828 includes a set of hardware, software, and/or firmware components that enable or facilitate inter-communication between the user of the computing system 800 and the processor 802 of the computing system 800. During operation of the computing system 800, the I/O subsystem 828 enables the user to interact with the computing system 800 through one or more I/O devices 830. Such I/O devices 830 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 802 through the system bus 810 via one or more interface ports (not shown) integrated within the I/O subsystem 828. Such interface ports may include, for example, a serial port, a parallel port, a game port, and/or a universal serial bus (USB).

In addition, such I/O devices 830 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 800 and to output information from the computing system 800 to a corresponding output device. Moreover, in some embodiments, the one or more output devices or channels are accessible via one or more adapters (not shown) integrated within the I/O subsystem 828.

In various embodiments, the computing system 800 is communicably coupled to any number of remote computing systems/servers 832. The remote computing system(s)/server(s) 832 may include, for example, one or more personal computers, one or more servers, one or more routers, one or more network PCs, one or more workstations, one or more microprocessor-based appliances, one or more mobile phones, and/or one or more peer devices or other common network nodes. As an example, in some embodiments, the computing system 800 is a centralized skills management server hosting the employee experience application 824 in a networked environment using logical connections to the remote computing systems/servers 832. In such embodiments, the computing system 800 may provide for execution of the employee experience application 824 on the remote computing systems/servers 832 with the enhanced functionality provided by the standardized skill tagging techniques described herein. As another example, in some embodiments, the computing system 800 is the centralized skills management server, and the remote computing systems/servers 832 include one or more global skills graph servers and/or one or more property graph servers that are accessed by the centralized skills management server during execution of the standardized skill tagging techniques described herein, as described further with respect to FIG. 9.

In various embodiments, the remote computing systems/servers 832 are logically connected to the computing system 800 through a network 834 and then connected via a communication connection 836, which may be wireless. The network 834 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 836 includes the hardware/software employed to connect the network 834 to the bus 810. While the communication connection 836 is shown for illustrative clarity as residing inside the computing system 800, it can also be external to the computing system 800. The hardware/software for connection to the network 834 may include, for example, internal and external technologies, such as mobile phone switches, modems including regular telephone grade modems, cable modems and DSL modems, ISDN adapters, and/or Ethernet cards.

As described above, system applications, such as the employee experience application 824, take advantage of the management of the computing resources by the operating system 820 through one or more program modules stored within the computer-readable storage medium (or media) 826. In some embodiments, the computer-readable storage medium 826 is integral to the computing system 800, in which case it may form part of the memory 804 and/or the disk storage 812. In other embodiments, the computer-readable storage medium 826 is an external device that is connected to the computing system 800 when in use.

In various embodiments, the one or more program modules stored within the computer-readable storage medium 826 include program instructions or code that may be executed by the processor 802 to perform various operations. In various embodiments, such program modules include, but are not limited to, a centralized skills management module 838 that includes any number of sub-modules for performing centralized skills management techniques. In particular, the centralized skills management module 838 includes a skill-tag standardization sub-module 840 that causes the processor 802 to perform operations that result in the execution of the standardized skill tagging techniques provided herein, as described with respect to the method 700 of FIG. 7, for example. Furthermore, in various embodiments, execution of the employee experience application 824 in conjunction with the centralized skills management module 838 may result in the surfacing of any number of enhanced skills-based functionalities during execution of the employee experience application 824 on the remote computing systems/servers 832.

It is to be understood that the block diagram of FIG. 8 is not intended to indicate that the computing system 800 is to include all of the components shown in FIG. 8. Rather, the computing system 800 can include fewer or additional components not illustrated in FIG. 8 (e.g., additional applications, additional modules, additional memory devices, additional network interfaces, etc.). Furthermore, any of the functionalities of the one or more program modules/sub-modules may be partially, or entirely, implemented in hardware and/or in the processor 802. For example, the functionality may be implemented with an application specific integrated circuit, in logic implemented in the processor 802, or in any other device.

Figure 9:
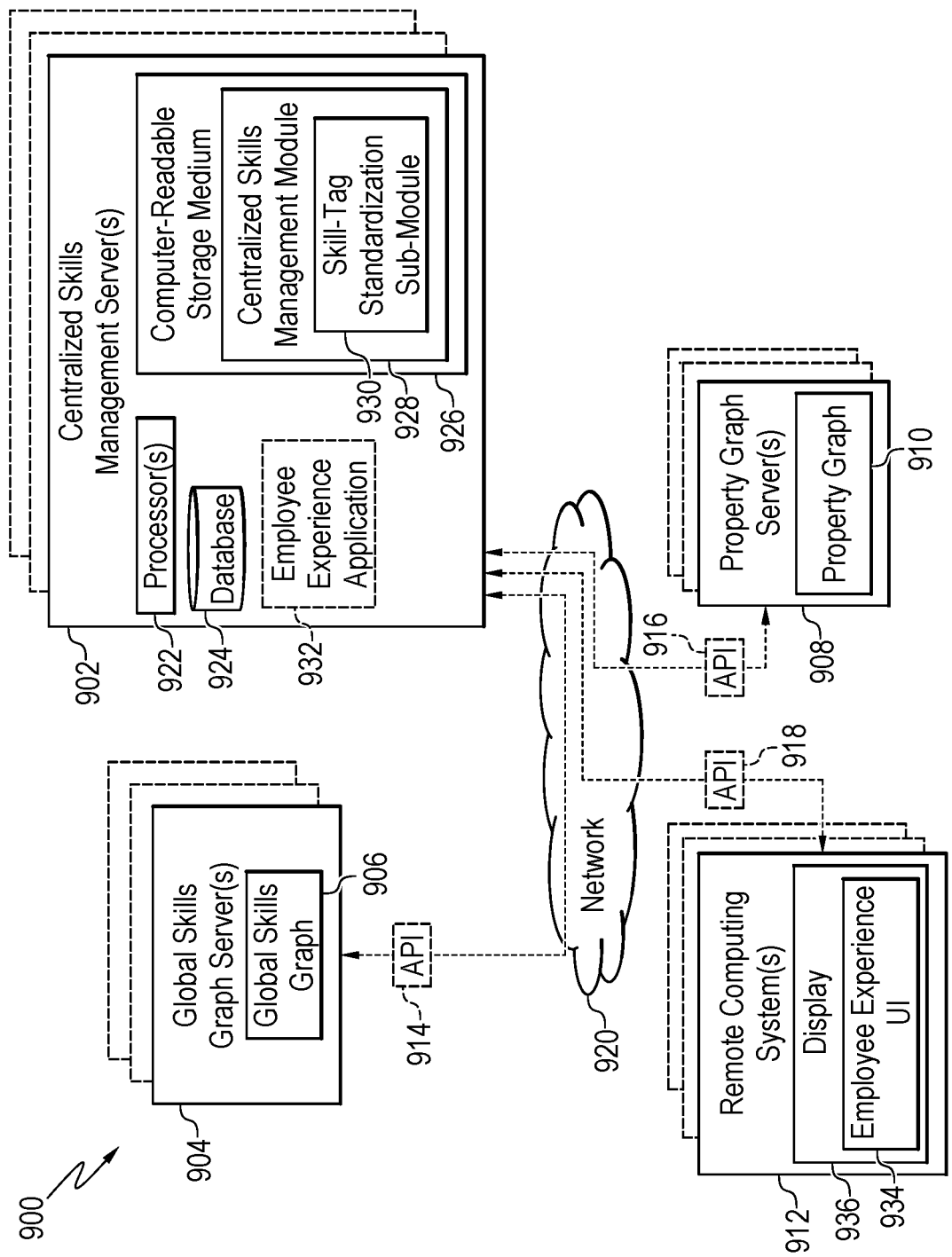
FIG. 9 is a block diagram of an exemplary network environment for implementing the standardized skill tagging techniques described herein.

FIG. 9 is a block diagram of an exemplary network environment 900 for implementing the standardized skill tagging techniques described herein. As shown in FIG. 9, the network environment 900 includes one or more centralized skills management server(s) 902 that provide for the execution of the standardized skill tagging techniques described herein. In addition, the network environment 900 may include one or more global skills graph servers 904 including skills-related data that are arranged and maintained in the form of a global skills graph 906 and one or more property graph servers 908 including various types of data objects (e.g., tenant-level data objects) that are arranged and maintained in the form of a property graph 910. Furthermore, the network environment 900 may include any number of remote computing systems 912. In various embodiments, the remote computing systems 912 include tenant-specific computing systems 912 that are operated by one or more admins/managers, employees, and the like corresponding to particular tenants (e.g., organizations).

In various embodiments, the centralized skills management server(s) 902 are configured to communicate with the global skills graph server(s) 904, the property graph server(s) 908, and the remote computing system(s) 912 via corresponding application programming interfaces (APIs) 914, 916, and 918, respectively, provided through a network 920. The network 920 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the centralized skills management server(s) 902 include one or more processors 922, a database 924 that functions as a repository for the standardized skill-tag data generated according to embodiments described herein, and a computer-readable storage medium 926 including a centralized skills management module 928 and a corresponding skill-tag standardization sub-module 930, as described herein. In various embodiments, the skill-tag standardization sub-module 930 directs the processor(s) 922 to interface with or access the global skills graph 906 and the property graph 910 via the corresponding APIs 914 and 916, thus enabling the generation of the standardized skill tags described herein.

In some embodiments, the centralized skills management server(s) 902 also include code corresponding to a web-based employee experience application 932. In such embodiments, the centralized skills management server(s) 902 may host the web-based employee experience application 932 on the remote computing system(s) 912 via the corresponding API 918. In particular, the centralized skills management server(s) 902 may provide for execution of the employee experience application 932 on the remote computing systems 912 by surfacing an employee experience user interface 934 on a display 936 corresponding to each remote computing system 912. Furthermore, in various embodiments, the data objects with the incorporated standardized skill tags, which are generated via execution of the skill-tag standardization sub-module 930, are used to provide one or more skills-based functionalities during execution of the employee experience application 932.

It is to be understood that the block diagram of FIG. 9 is not intended to indicate that the network environment 900 is to include all of the components shown in FIG. 9. Rather, the network environment 900 can include fewer or additional components not illustrated in FIG. 9. For example, in practice, the centralized skills management sever(s) 902 will include a number of additional components not depicted in the simplified block diagram of FIG. 9, as described with respect to the computing system 800 of FIG. 8, for example. Moreover, in some embodiments, the centralized skills management sever(s) 902, the global skills graph server(s) 904, and/or the property graph server(s) 908 may be combined into a single server (or series of servers). Furthermore, in some embodiments, the employee experience application 914 may be provided by one or more separate employee experience application servers (not shown), rather than being combined with the centralized skills management server(s) 902.

Figure 10:
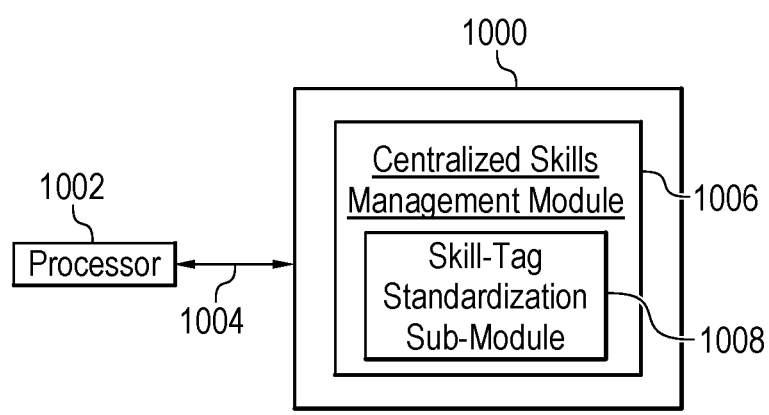
FIG. 10 is a block diagram of an exemplary computer-readable storage medium for implementing the standardized skill tagging techniques described herein.

FIG. 10 is a block diagram of an exemplary computer-readable storage medium 1000 for implementing the standardized skill tagging techniques described herein. In various embodiments, the computer-readable storage medium 1000 is accessed by a processor 1002 over a computer interconnect 1004. For example, in some embodiments, the computer-readable storage medium 1000 is the same as, or similar to, the computer-readable storage medium described with respect to the computing system 800 of FIG. 8 and/or the network environment 900 of FIG. 9.

In various embodiments, the computer-readable storage medium 1000 includes code (i.e., computer-executable instructions) to direct the processor 1002 to perform the operations of the present techniques. Such code may be stored within the computer-readable storage medium 1000 in the form of program modules, where each module includes a set of computer-executable instructions that, when executed by the processor 1002, cause the processor 1002 to perform a corresponding set of operations. In particular, in various embodiments, the computer-readable storage medium 1000 includes a centralized skills management module 1006 that directs the processor 1002 to perform centralized skills management techniques, as described herein. Furthermore, in various embodiments, the centralized skills management module 1006 accomplishes this via one or more sub-modules. Such sub-modules may include, but are not limited to, a skill-tag standardization sub-module 1008 that directs the processor 1002 to perform the standardized skill tagging techniques described herein (or any suitable variation thereof). Such techniques include, but are not limited to, the method 700 described with respect to FIG. 7.

Moreover, those skilled in the art will appreciate that any suitable number of the modules/sub-modules shown in FIG. 10 may be included within the computer-readable storage medium 1000. Furthermore, any number of additional modules/sub-modules not shown in FIG. 10 may be included within the computer-readable storage medium 1000, depending on the details of the specific implementation.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

EXAMPLES

Example 1 is a method for standardized skill tagging. The method is implemented in a computing system comprising a processor. The method includes accessing, via the processor, a property graph including data objects corresponding to a tenant and extracting skills-related terms from object metadata corresponding to the data objects within the property graph. The method also includes interfacing with a global skills graph via an API and importing standardized skill tags from the global skills graph, where the imported standardized skill tags relate to the extracted skills-related terms from the object metadata. The method further includes incorporating the standardized skill tags into the object metadata for the corresponding data objects within the property graph.

Example 2 includes the method of example 1, including or excluding optional features. In this example, the method includes utilizing the data objects with the incorporated standardized skill tags to provide a skills-related functionality within the context of an employee experience application executed on a remote computing system associated with the tenant.

Example 3 includes the method of example 1 or 2, including or excluding optional features. In this example, the method includes anonymizing the skills-related terms extracted from the object metadata prior to interfacing with the global skills graph.

Example 4 includes the method of any one of examples 1 to 3, including or excluding optional features. In this example, the method includes extracting the skills-related terms from the object metadata using AI-based techniques.

Example 5 includes the method of any one of examples 1 to 4, including or excluding optional features. In this example, the method includes performing the following prior to accessing the property graph: (1) executing web-based applications on remote computing systems that are operated by users associated with the tenant; and (2) storing application data objects generated during the execution of the web-based applications as at least a portion of the data objects within the property graph.

Example 6 includes the method of any one of examples 1 to 5, including or excluding optional features. In this example, the method includes performing the following prior to accessing the property graph: (1) importing third-party data objects associated with the tenant from third-party application provider systems; and (2) storing the imported third-party data objects as at least a portion of the data objects within the property graph.

Example 7 includes the method of any one of examples 1 to 6, including or excluding optional features. In this example, method includes updating the standardized skill tags within the global skills graph using the skills-related terms from the object metadata.

Example 8 includes the method of any one of examples 1 to 7, including or excluding optional features. In this example, at least a portion of the data objects within the property graph include at least one of a user profile data object, a learning data object, a position data object, or a key phrase data object.

Example 9 includes the method of any one of examples 1 to 8, including or excluding optional features. In this example, at least a portion of the data objects within the property graph include skill data objects that are generated based on a tenant skills list relating to the tenant.

Example 10 is a centralized skills management server. The centralized skills management server includes a processor and a computer-readable storage medium operatively coupled to the processor. The computer-readable storage medium includes computer-executable instructions that, when executed by the processor, cause the processor to access a property graph including data objects corresponding to a tenant and to extract skills-related terms from object metadata corresponding to the data objects within the property graph. The computer-readable storage medium also includes computer-executable instructions that, when executed by the processor, cause the processor to interface with a global skills graph via an API and to import standardized skill tags from the global skills graph, where the imported standardized skill tags relate to the extracted skills-related terms from the object metadata. The computer-readable storage medium further includes computer-executable instructions that, when executed by the processor, cause the processor to incorporate the standardized skill tags into the object metadata for the corresponding data objects within the property graph.

Example 11 includes the centralized skills management server of example 10, including or excluding optional features. In this example, the computer-readable storage medium includes computer-executable instructions that, when executed by the processor, cause the processor to utilize the data objects with the incorporated standardized skill tags to provide a skills-related functionality within the context of an employee experience application executed on a remote computing system associated with the tenant.

Example 12 includes the centralized skills management server of example 10 or 11, including or excluding optional features. In this example, the computer-readable storage medium includes computer-executable instructions that, when executed by the processor, cause the processor to anonymize the skills-related terms extracted from the object metadata prior to interfacing with the global skills graph.

Example 13 is the includes the centralized skills management server of any one of examples 10 to 12, including or excluding optional features. In this example, the computer-readable storage medium includes computer-executable instructions that, when executed by the processor, cause the processor to extract the skills-related terms from the object metadata using AI-based techniques.

Example 14 includes the centralized skills management server of any one of examples 10 to 13, including or excluding optional features. In this example, the computer-readable storage medium includes computer-executable instructions that, when executed by the processor, cause the processor to perform the following prior to accessing the property graph: (1) execute web-based applications on remote computing systems that are operated by users associated with the tenant; and (2) store application data objects generated during the execution of the web-based applications as at least a portion of the data objects within the property graph.

Example 15 includes the centralized skills management server of any one of examples 10 to 14, including or excluding optional features. In this example, the computer-readable storage medium includes computer-executable instructions that, when executed by the processor, cause the processor to perform the following prior to accessing the property graph: (1) import third-party data objects associated with the tenant from third-party application provider systems; and (2) store the imported third-party data objects as at least a portion of the data objects within the property graph.

Example 16 includes the centralized skills management server of any one of examples 10 to 15, including or excluding optional features. In this example, the computer-readable storage medium includes computer-executable instructions that, when executed by the processor, cause the processor to update the standardized skill tags within the global skills graph using the skills-related terms from the object metadata.

Example 17 is a computer-readable storage medium. The computer-readable storage medium includes computer-executable instructions that, when executed by a processor, cause the processor to access a property graph including data objects corresponding to a tenant and to extract skills-related terms from object metadata corresponding to the data objects within the property graph. The computer-readable storage medium also includes computer-executable instructions that, when executed by the processor, cause the processor to interface with a global skills graph via an API and to import standardized skill tags from the global skills graph, where the imported standardized skill tags relate to the extracted skills-related terms from the object metadata. The computer-readable storage medium further includes computer-executable instructions that, when executed by the processor, cause the processor to incorporate the standardized skill tags into the object metadata for the corresponding data objects within the property graph.

Example 18 includes the computer-readable storage medium of example 17, including or excluding optional features. In this example, the computer-readable storage medium includes computer-executable instructions that, when executed by the processor, cause the processor to utilize the data objects with the incorporated standardized skill tags to provide a skills-related functionality within the context of an employee experience application executed on a remote computing system associated with the tenant.

Example 19 includes the computer-readable storage medium of example 17 or 18, including or excluding optional features. In this example, the computer-readable storage medium includes computer-executable instructions that, when executed by the processor, cause the processor to anonymize the skills-related terms extracted from the object metadata prior to interfacing with the global skills graph.

Example 20 includes the computer-readable storage medium of any one of examples 17 to 19, including or excluding optional features. In this example, the computer-readable storage medium includes computer-executable instructions that, when executed by the processor, cause the processor to perform the following prior to accessing the property graph: (1) execute web-based applications on remote computing systems that are operated by users associated with the tenant; and (2) store application data objects generated during the execution of the web-based applications as at least a portion of the data objects within the property graph.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for standardized skill tagging, wherein the method is implemented in a computing system comprising a processor, and wherein the method comprises:

executing an email or messaging application and a training application as web-based applications on remote computing systems operated by employees of a tenant organization;

accessing, via the processor, object metadata from data objects within a property graph of the tenant organization, the property graph of the tenant organization including nodes representing the data objects within the property graph and edges connecting the nodes that represent relationships between the data objects within the property graph, wherein the data objects within the property graph include a user profile data object identifying the employees of the tenant organization and one or more application-specific data objects including application-specific metadata extracted from a common suite of applications used by the employees of the tenant organization;

extracting skills-related terms from the object metadata, the skills-related terms having been identified by scraping using natural language processing (NLP) techniques correspondence pertaining to use of the email or messaging application by the employees and signals pertaining to use of the training application by the employees, the email or messaging application and the training application belonging to the common suite of applications;

interfacing with a global skills graph via an application programming interface (API);

importing, from the global skills graph via the API, standardized skill tags associated with the skills-related terms extracted from the object metadata; and incorporating the standardized skill tags into the object metadata corresponding to the data objects within the property graph.

2. The method of claim 1, further comprising utilizing the data objects with the standardized skill tags to provide a skills-related functionality using an employee experience application executed on a remote computing system associated with the tenant organization.

3. The method of claim 1, further comprising anonymizing the skills-related terms extracted from the object metadata prior to interfacing with the global skills graph.

4. The method of claim 1, further comprising extracting the skills-related terms from the object metadata using artificial intelligence (AI) based techniques.

5. The method of claim 1, further comprising, prior to accessing the property graph:

storing application data objects generated during the execution of the web-based applications as at least a portion of the data objects within the property graph.

6. The method of claim 1, further comprising prior to accessing the property graph:

importing third-party data objects associated with the tenant organization from third-party application provider systems; and storing the imported third-party data objects as at least a portion of the data objects within the property graph.

7. The method of claim 1, further comprising updating the standardized skill tags within the global skills graph using the skills-related terms from the object metadata.

8. The method of claim 1, wherein at least a portion of the data objects within the property graph comprise at least one of a user profile data object, a learning data object, a position data object, or a key phrase data object.

9. The method of claim 1, wherein at least a portion of the data objects within the property graph comprise skill data objects that are generated based on a tenant organization skills list relating to the tenant organization.

10. The method of claim 1, wherein the one or more application-specific data objects include a file data object including application-specific metadata extracted from a word processing application used by the employees of the tenant organization, a calendar data object including application-specific metadata extracted from an email management application used by the employees of the tenant organization, and a groups data object including application-specific metadata extracted from a collaboration application used by the employees of the tenant organization.

11. The method of claim 10, wherein the word processing application, the email management application, and the collaboration application are included in a suite of software services/applications provided by a common vendor/provider.

12. The method of claim 1, wherein the one or more application-specific data objects include application-specific data objects relating to users, teams, chats, tasks, insights, coworkers, groups, calendars, files, messages, meetings, people, devices, learning, and positions.

13. A centralized skills management server, comprising:

a processor, and a computer-readable storage medium operatively coupled to the processor, the computer-readable storage medium comprising computer-executable instructions that, when executed by the processor, cause the processor to:

execute an email or messaging application and a training application as web-based applications on remote computing systems operated by employees of a tenant organization;

access object metadata from data objects within a property graph of the tenant organization, the property graph of the tenant organization including nodes representing the data objects within the property graph and edges connecting the nodes that represent relationships between the data objects within the property graph, wherein the data objects within the property graph include a user profile data object identifying the employees of the tenant organization and one or more application-specific data objects including application-specific metadata extracted from a common suite of applications used by the employees of the tenant organization;

extract skills-related terms from the object metadata, the skills-related terms having been identified by scraping using natural language processing (NLP) techniques correspondence pertaining to use of the email or messaging application by the employees and signals pertaining to use of the training application by the employees, the email or messaging application and the training application belonging to the common suite of applications;

interface with a global skills graph via an application programming interface (API);

import, from the global skills graph via the API, standardized skill tags associated with the skills-related terms extracted from the object metadata; and incorporate the standardized skill tags into the object metadata corresponding to the data objects within the property graph.

14. The centralized skills management server of claim 13, wherein the computer-readable storage medium comprises computer-executable instructions that, when executed by the processor, cause the processor to utilize the data objects with the standardized skill tags to provide a skills-related functionality using an employee experience application executed on a remote computing system associated with the tenant organization.

15. The centralized skills management server of claim 13, wherein the computer-readable storage medium comprises computer-executable instructions that, when executed by the processor, cause the processor to anonymize the skills-related terms extracted from the object metadata prior to interfacing with the global skills graph.

16. The centralized skills management server of claim 15, wherein the one or more application-specific data objects include a file data object including application-specific metadata extracted from a word processing application used by the employees of the tenant organization, a calendar data object including application-specific metadata extracted from an email management application used by the employees of the tenant organization, and a groups data object including application-specific metadata extracted from a collaboration application used by the employees of the tenant organization.

17. The centralized skills management server of claim 16, wherein the word processing application, the email management application, and the collaboration application are included in a suite of software services/applications provided by a common vendor/provider.

18. The centralized skills management server of claim 15, wherein the one or more application-specific data objects include application-specific data objects relating to users, teams, chats, tasks, insights, coworkers, groups, calendars, files, messages, meetings, people, devices, learning, and positions.

19. The centralized skills management server of claim 13, wherein the computer-readable storage medium comprises computer-executable instructions that, when executed by the processor, cause the processor to extract the skills-related terms from the object metadata using artificial intelligence (AI) based techniques.

20. The centralized skills management server of claim 13, wherein the computer-readable storage medium comprises computer-executable instructions that, when executed by the processor, cause the processor to, prior to accessing the property graph:
store application data objects generated during the execution of the web-based applications as at least a portion of the data objects within the property graph.

21. The centralized skills management server of claim 13 wherein the computer-readable storage medium comprises computer-executable instructions that, when executed by the processor, cause the processor to, prior to accessing the property graph:
import third-party data objects associated with the tenant organization from third-party application provider systems; and
store the imported third-party data objects as at least a portion of the data objects within the property graph.

22. The centralized skills management server of claim 13, wherein the computer-readable storage medium comprises computer-executable instructions that, when executed by the processor, cause the processor to update the standardized skill tags within the global skills graph using the skills-related terms from the object metadata.

23. A computer-readable storage medium comprising computer-executable instructions that, when executed by a processor, cause the processor to:
execute an email or messaging application and a training application as web-based applications on remote computing systems operated by employees of a tenant organization;
access object metadata from data objects within a property graph of the tenant organization, the property graph of the tenant organization including nodes representing the data objects within the property graph and edges connecting the nodes that represent relationships between the data objects within the property graph, wherein the data objects within the property graph include a user profile data object identifying the employees of the tenant organization and one or more application-specific data objects including application-specific metadata extracted from a common suite of applications used by the employees of the tenant organization;
extract skills-related terms from the object metadata, the skills-related terms having been identified by scraping using natural language processing (NLP) techniques correspondence pertaining to use of the email or messaging application by the employees and signals pertaining to use of the training application by the employees, the email or messaging application and the training application belonging to the common suite of applications;
interface with a global skills graph via an application programming interface (API);
import, from the global skills graph via the API, standardized skill tags associated with the skills-related terms extracted from the object metadata; and
incorporate the standardized skill tags into the object metadata corresponding to the data objects within the property graph.

24. The computer-readable storage medium of claim 23, wherein the one or more application-specific data objects include a file data object including application-specific metadata extracted from a word processing application used by the employees of the tenant organization, a calendar data object including application-specific metadata extracted from an email management application used by the employees of the tenant organization, and a groups data object including application-specific metadata extracted from a collaboration application used by the employees of the tenant organization.

25. The computer-readable storage medium of claim 24, wherein the word processing application, the email management application, and the collaboration application are included in a suite of software services/applications provided by a common vendor/provider.

26. The computer-readable storage medium of claim 23, wherein the one or more application-specific data objects include application-specific data objects relating to users, teams, chats, tasks, insights, coworkers, groups, calendars, files, messages, meetings, people, devices, learning, and positions.

* * * * *